United States Patent
Rundell et al.

(10) Patent No.: US 12,179,536 B2
(45) Date of Patent: Dec. 31, 2024

(54) UNDER BEAM LIFT ASSEMBLY FOR HEAVY-DUTY VEHICLES

(71) Applicant: Hendrickson USA, L.L.C., Schaumburg, IL (US)

(72) Inventors: Gavin M. Rundell, Medina, OH (US); Dominic J. Romito, Massillon, OH (US); Jason W. Jones, North Canton, OH (US); R. Scott Fulton, Hudson, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 18/376,062

(22) Filed: Oct. 3, 2023

(65) Prior Publication Data

US 2024/0116320 A1    Apr. 11, 2024

Related U.S. Application Data

(60) Provisional application No. 63/413,281, filed on Oct. 5, 2022.

(51) Int. Cl.
*B60G 17/015* (2006.01)
*B60G 9/02* (2006.01)

(52) U.S. Cl.
CPC ........... *B60G 17/0155* (2013.01); *B60G 9/02* (2013.01); *B60G 2202/412* (2013.01);
(Continued)

(58) Field of Classification Search
CPC ................. B60G 17/0155; B60G 9/02; B60G 2202/412; B60G 2204/422;
(Continued)

(56) References Cited

U.S. PATENT DOCUMENTS

| 4,171,830 A | 10/1979 | Metz |
| 4,300,787 A | 11/1981 | Vandenberg |

(Continued)

FOREIGN PATENT DOCUMENTS

| DE | 102006015671 A1 * | 10/2007 | ............. B60G 9/003 |
| DE | 102010019292 A1 * | 11/2011 | ............... B60G 3/01 |

(Continued)

OTHER PUBLICATIONS

VALX; "VALX Trailer axles Trailer builder manual"; Manual; Mar. 2018; Document: TBM_2052-01, Revision 01; Veghel, Netherlands; Entire Document.

(Continued)

*Primary Examiner* — Drew J Brown
(74) *Attorney, Agent, or Firm* — Dureska & Moore, LLC; David P. Dureska; David J. Danko

(57) ABSTRACT

An under beam lift assembly for a heavy-duty vehicle that is removably connectable with an axle/suspension system of the heavy-duty vehicle. The under beam lift assembly includes structure that enables the lift assembly to pivot in an axis different than an axis of a pivotal connection between a suspension assembly and a hanger of the axle/suspension (Continued)

system. The under beam lift assembly is free of contact with the pivotal connection between the suspension assembly and the hanger of the axle/suspension system.

27 Claims, 9 Drawing Sheets

(52) U.S. Cl.
CPC .............. *B60G 2204/422* (2013.01); *B60G 2204/4702* (2013.01); *B60G 2206/601* (2013.01); *B60G 2300/026* (2013.01); *B60G 2500/30* (2013.01)

(58) Field of Classification Search
CPC ...... B60G 2204/4702; B60G 2206/601; B60G 2300/026; B60G 2500/30; B60G 2200/31; B60G 2204/4302; B60G 9/003; B60G 2300/402
See application file for complete search history.

(56) References Cited

U.S. PATENT DOCUMENTS

| | | | |
|---|---|---|---|
| 5,588,665 | A | 12/1996 | Pierce et al. |
| 6,416,069 | B1 | 7/2002 | Ramsey |
| 6,752,406 | B2 | 6/2004 | Pierce et al. |
| 6,845,989 | B2 | 1/2005 | Fulton et al. |
| 7,854,436 | B2 | 12/2010 | Hock et al. |
| 8,322,734 | B2 | 12/2012 | Yao |
| 8,459,666 | B2 | 6/2013 | Piehl et al. |
| 8,870,198 | B2 | 10/2014 | Karel et al. |
| 8,967,646 | B2 | 3/2015 | Schwarz et al. |
| 11,225,287 | B1 | 1/2022 | Schuck et al. |
| 11,712,938 | B1 * | 8/2023 | Klein ............... B60G 9/00 280/86.5 |
| 2008/0284123 | A1 * | 11/2008 | Billian ............. B60G 11/27 280/124.116 |
| 2017/0087949 | A1 * | 3/2017 | Lindsay ........... B60G 9/003 |
| 2019/0077468 | A1 * | 3/2019 | Hulstein ........... B60G 9/00 |

FOREIGN PATENT DOCUMENTS

| | | | | |
|---|---|---|---|---|
| DE | 102010060273 A1 * | 5/2012 | ......... B60G 11/27 |
| DE | 102013113492 A1 * | 6/2015 | ......... B60G 11/465 |
| EP | 0836984 A1 | 4/1998 | |
| EP | 0941915 A1 | 9/1999 | |
| EP | 1332954 A1 | 8/2003 | |
| EP | 1661739 A1 | 5/2006 | |
| EP | 1902933 A2 * | 3/2008 | ......... B62D 61/12 |
| EP | 2774830 A1 * | 9/2014 | ......... B60G 9/003 |
| EP | 2915727 A1 | 9/2015 | |
| EP | 2796340 B1 | 7/2018 | |
| EP | 3473457 A1 | 4/2019 | |
| EP | 3489047 A1 | 5/2019 | |
| ES | 2775797 T3 * | 7/2020 | ......... B60G 11/465 |
| NL | 2028627 B1 * | 1/2023 | ......... B60G 11/27 |
| WO | 2016022024 A1 | 2/2016 | |
| WO | WO-2023280780 A1 * | 1/2023 | ......... B60G 11/27 |

OTHER PUBLICATIONS

Acceval Accesorios Y Elevadores Valencia; "Relevages D'essieu Pour Remorques Et Semi-Remorques"; Technical Manual; May 2013; Valencia, Spain; Entire Document.
JOST; "JOST Twin Lift"; Informational Pamphlet; FLY 009 015 EN_08-2018; Germany; Entire Document.
JOST; JOST Twin Lift Photograph; 2022; Entire Document.

* cited by examiner

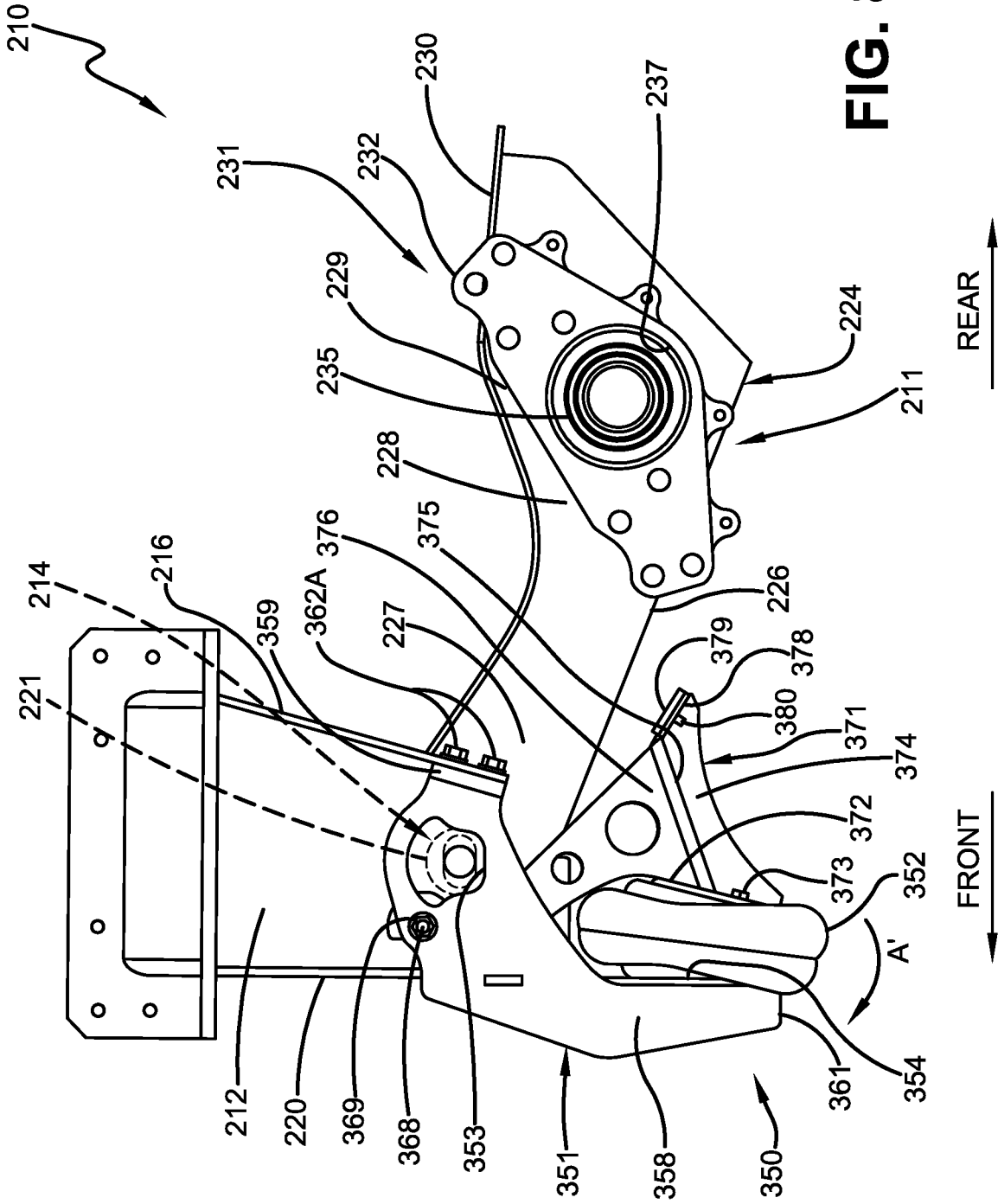

UNDER BEAM LIFT ASSEMBLY FOR HEAVY-DUTY VEHICLES

CROSS-REFERENCE TO RELATED APPLICATION

This application claims the benefit of U.S. Provisional Patent Application Ser. No. 63/413,281 filed on Oct. 5, 2022.

BACKGROUND

Technical Field

The disclosed subject matter relates to axle/suspension systems for heavy-duty vehicles, and in particular, to lift assemblies for axle/suspension systems of heavy-duty vehicles. More specifically, the subject matter relates to an under beam lift assembly for heavy-duty vehicles that enables an axle of an axle/suspension system to be raised or lifted, and thus enables the associated wheels to be lifted from the ground. The under beam lift assembly of the disclosed subject matter is removably mounted to the axle/suspension system of the heavy-duty vehicle utilizing mechanical fasteners, which eliminates the need for welds to attach the under beam lift assembly to the axle/suspension system, thereby eliminating the need for specialized technical skill/knowledge and specialized equipment to perform the installation process and providing a less labor intensive and less costly installation process. The under beam lift assembly of the disclosed subject matter includes structure that enables it to be attached to the axle/suspension system of the heavy-duty vehicle such that the under beam lift assembly pivots in an axis different than an axis of the pivotal connection between a beam of a suspension assembly of the axle/suspension system and a hanger of the axle/suspension system. This significantly minimizes or eliminates stress on the pivotal connection between the beam and the hanger when the under beam lift assembly is actuated, thereby protecting the integrity of components of the pivotal connection of the beam to the hanger, such as a bushing and/or a pivot bolt of a bushing assembly, during actuation of the under beam lift assembly. Moreover, the under beam lift assembly of the disclosed subject matter is configured such that there is no rigid attachment of the under beam lift assembly to the beam of the suspension assembly of the axle/suspension system, which prevents components of the under beam lift assembly from articulating with the beam during operation of the heavy-duty vehicle when the under beam lift assembly is unactuated, thereby reducing stress on components of the under beam lift assembly and/or suspension assembly during such operation of the heavy-duty vehicle. Furthermore, the under beam lift assembly of the disclosed subject matter includes a self-retaining vacuum retention system for a lift air chamber of the under beam lift assembly that maintains the under beam lift assembly in a fully retracted state when not actuated, which minimizes the potential for damage to components of the under beam lift assembly and/or beam of the suspension assembly of the axle/suspension system during axle/suspension system rebound. In addition, the under beam lift assembly is configured such that it can be mounted to the axle/suspension system of the heavy-duty vehicle at different points during the manufacturing process of the axle/suspension system and/or the heavy-duty vehicle, such as before/after the beam of the suspension assembly of the axle/suspension system is attached to the hanger or before/after the axle/suspension system is attached to a frame of the heavy-duty vehicle, thereby providing greater installation flexibility and/or enabling independent servicing or replacement of components of the under beam lift assembly and/or axle/suspension system. Furthermore, because the under beam lift assembly pivots in an axis different than the axis of the pivotal connection between the beam of the suspension assembly and the hanger and utilizes mechanical fasteners to removably mount the under beam lift assembly to the axle/suspension system, the under beam lift assembly can be fully assembled into one packaged unit prior to installation on the axle/suspension system, thereby reducing installation complexity.

Background Art

The use of air-ride trailing and leading arm rigid beam-type axle/suspension systems has been popular in the heavy-duty vehicle industry for many years. Heavy-duty vehicles include trucks and tractor-trailers or semi-trailers, and trailers thereof. Although such axle/suspension systems can be found in widely varying structural forms, in general their structure is similar in that each axle/suspension system typically includes a pair of suspension assemblies. In some heavy-duty vehicles, the suspension assemblies are connected to hangers, which in turn are directly connected to the main members of the primary frame of the vehicle. In other heavy-duty vehicles, the primary frame of the vehicle supports a subframe, and the hangers to which the suspension assemblies are connected are connected to the main members of the subframe. For those heavy-duty vehicles that support a subframe, the subframe can be non-movable or movable, the latter being commonly referred to as a slider box, slider subframe, slider undercarriage, or secondary slider frame. For purposes of convenience and clarity, reference herein will be made to main members, with the understanding that such reference is by way of example, and that the disclosed subject matter applies to heavy-duty vehicle axle/suspension systems suspended from main members of primary frames, movable subframes and non-movable subframes.

Typically, each suspension assembly of an axle/suspension system includes a longitudinally extending elongated beam. Each beam typically is located adjacent to and below a respective one of a pair of spaced-apart longitudinally extending main members and one or more cross members that form the frame of the vehicle. More specifically, each beam is pivotally connected at one of its ends to a hanger via a bushing assembly. The hanger in turn is attached to and depends from a respective one of the main members of the vehicle. The opposite end of each beam also is connected to a bellows-type air spring or its equivalent, which in turn is connected to the respective one of the main members. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle. An axle extends between and is connected by some means to the beams of the pair of suspension assemblies at a selected location from about the mid-point to the end of the beam opposite from its pivotal connection to the hanger. A wheel hub of a wheel end assembly is rotatably mounted on each end of the axle, as is known in the art. A tire is mounted on a rim, which in turn is attached to the wheel hub of each wheel end assembly.

Together the wheel rim and mounted tire are collectively referred to as a "wheel" for purposes of this disclosure.

Many heavy-duty vehicles include axle/suspension systems with structure that can raise or lift the axle of the axle/suspension system, and thus lift the associated wheels from contact with the ground. Axle/suspension systems that employ such suspension assemblies are conventionally known in the industry as lift axle/suspension systems. Lift axle/suspension systems usually are paired or grouped with non-lift axle/suspension systems on a vehicle, the latter of which are commonly referred to as primary axle/suspension systems. Lift axle/suspension systems commonly utilize beam lift assemblies incorporated into the axle/suspension systems that include one or more lift elements, such as pneumatic air springs or lift air chambers, that can act on the beams of the suspension assemblies to raise or lift the associated beams of the suspension assemblies. This in turn enables the axle connected thereto to be lifted and maintained in a raised position, and thus lift and maintain the associated wheels out of contact with the ground. Removing the associated wheels of the lift axle/suspension system from ground contact via the beam lift assemblies typically is done when the heavy-duty vehicle is free of payload and less than all of the wheels of the heavy-duty vehicle can adequately support the unloaded vehicle to promote fuel savings, or when greater maneuverability of the vehicle is desired. This lifting operation also results in reduced wear on the lifted axle and associated wheels when the heavy-duty vehicle is traveling in an unloaded condition. Additionally, lifting of the axles and associated wheels can result in toll savings as the axles accounted for in determining toll costs are often only those which are in contact with the ground.

A number of different types of beam lift assemblies with various components and mounting configurations have been utilized with lift axle/suspension systems. For example, such beam lift assemblies have been mounted to the suspension assemblies of lift axle/suspension systems such that they are mounted generally adjacent to and beneath the beams of the suspension assemblies, commonly referred to as under beam lift assemblies in the art. In most heavy-duty vehicle applications, under beam lift assemblies are often preferred over other types of beam lift assemblies with different mounting configurations, such as side-beam lift assemblies, so long as they are capable of being accommodated by the particular vehicle configuration as they typically include relatively less components, less complex mounting structure, decreased manufacturing complexity, and/or decreased overall weight. Such prior art under beam lift assemblies typically have been attached on the front portion of the hanger via a mounting bracket that extends below the hanger and is attached thereto via welds and/or fasteners. The lift air chambers of such prior art under beam lift assemblies are connected to the mounting brackets of the lift assemblies at one end and are connected to lift brackets of the lift assemblies at the other end, which in turn are typically attached to the underside of respective beams of the suspensions assemblies of the lift axle/suspension system via welds and/or fasteners. The lift air chambers are in fluid communication with a pressurized air source located on the heavy-duty vehicle. Actuation of such prior art under beam lift assemblies causes inflation of the lift air chambers, which urges their associated beams upwardly to lift the axle, and thus lift the associated wheels from the ground surface.

With such prior art under beam lift assemblies, a number of different types of pneumatic or electro-pneumatic systems have been employed to operate lift axle/suspension systems, depending on the application and end-user requirements. Most of such systems operate by simultaneously, but independently, supplying pressurized or compressed air to the lift air chambers of the lift assemblies and concurrently exhausting air pressure from the ride air springs when it is desired to lift or raise the axle and associated wheels. Conversely, when it is desired to lower the axle and associated wheels to support a load, air pressure is supplied to the ride air springs and concurrently exhausted from the lift air chambers of the under beam lift assemblies.

While generally suitable for their intended purpose, such prior art under beam lift assemblies for lift axle/suspension systems of heavy-duty vehicles have certain disadvantages, drawbacks, and limitations. For example, such prior art under beam lift assemblies often require welds to rigidly attached one or more components of the lift assemblies to the heavy-duty vehicle, such as to attach the mounting brackets of the lift assemblies to the hangers of the lift axle/suspension system and/or attach the lift brackets of the lift assemblies to the beams of the suspension assemblies of the lift axle/suspension system, which requires a relatively labor intensive and costly process for installing the lift assemblies on the heavy-duty vehicle.

Moreover, such prior art under beam assemblies are often options that are incorporated into heavy-duty vehicles after the axle/suspension system is purchased to convert the axle/suspension system to a lift axle/suspension system, and thus must be installed by the manufacturer of the heavy-duty vehicle or fleet. Not all vehicle manufacturers or fleets are equipped to perform the installation of such prior art under beam lift assemblies. For example, in prior art under beam lift assemblies that require welding of components to the heavy-duty vehicle, such as to the beams of the suspension assemblies and/or hangers, the welding procedures and specifications require a substantial amount of specialized technical skill/knowledge and specialized equipment to perform the installation process. Some vehicle manufactures or fleets may not have personnel with such technical skill/knowledge or lack the specialized equipment to execute the installation.

Furthermore, such prior art under beam lift assemblies also are typically mounted to the lift axle/suspension systems such that they pivot about the same axis as the pivotal connections of the beams of the suspension assemblies to the hangers of the lift axle/suspension system via the bushing assemblies, are incorporated into the pivotal connections of the beams to the hangers, and/or directly contact components of the bushing assemblies when the under beam lift assemblies are actuated and the axle and associated wheels are lifted from contact with the ground, and thus the bushing assembly reacts the load of the lift axle/suspension system when lifted via components of the under beam lift assembly. These types of connections and/or operations increase stress on components of the bushing assemblies of such lift axle/suspension systems, such as the bushings and pivot bolts, when the lift assemblies are actuated and axle and associated wheels are lifted, thereby potentially reducing the life of components of the bushing assemblies and compromising the pivotal connections of the beams of the suspension assemblies to the hangers, which in turn can result in increased maintenance of the heavy-duty vehicle and vehicle downtime.

Moreover, such prior art under beam lift assemblies often include configurations in which components of the under beam lift assemblies, such as the lift brackets, are rigidly attached to the beams of the suspension assemblies via fasteners and/or welds, such that the components of the under beam lift assemblies articulate with the beams during normal operation of the associated lift axle/suspension system of the heavy-duty vehicle, i.e., when the under beam lift assemblies are unactuated, the axle is lowered, and the associated wheels are in contact with the ground. This undesirably increases stress on components of the under beam lift assemblies, such as the lift air chambers, during operation of the heavy-duty vehicle when the under beam lift assemblies are unactuated, thereby potentially decreasing the life of the components and resulting in increased maintenance of the heavy-duty vehicle and vehicle downtime.

Furthermore, such prior art under beam lift assemblies are typically configured such that they do not provide desirable installation flexibility and/or do not enable servicing of components of the lift axle/suspension system and/or under beam lift assemblies once installed. More specifically, when such prior art under beam lift assemblies are incorporated into the pivotal connections of the beams of the suspension assemblies of the lift axle/suspension system to the hangers of the lift axle/suspension system, they must be installed during pivotal connection of the beams to the hangers, and thus cannot be installed after the lift axle/suspension system is fully manufactured. Moreover, if components of such prior art under beam lift assemblies require rigid attachment to the beams of the suspension assemblies of the lift axle/suspension system, such as via welds, they must be installed on the lift axle/suspension system before the beams are pivotally connected to the hangers, while other components are installed after the beams are pivotally connected to the hangers. In addition, such prior art under beam lift assemblies often do not enable servicing of components of the lift axle/suspension system once installed, such as the bushing assemblies and components thereof and/or the beams of the suspension assemblies of the heavy-duty vehicle, and/or do not enable servicing of components of the under beam lift assemblies once installed, and thus must be removed from the lift axle/suspension system, require certain components of the under beam lift assemblies to be disconnected from each other, and/or require removal of certain components of the lift axle/suspension system to enable servicing of such components. For example, if the prior art under beam lift assembly employs a lift bracket or equivalent structure rigidly connected to the beam of the suspension assembly of the axle/suspension system via welds and the lift bracket requires replacement, the beam typically must be removed from the lift axle/suspension to enable the lift bracket to be removed and replaced.

Thus, there is a need in the art for an under beam lift assembly for heavy-duty vehicles that is mountable to the axle/suspension system of a heavy-duty vehicle utilizing mechanical fasteners, which eliminates the need to utilize welds to attach the under beam lift assembly to the heavy-duty vehicle, thereby eliminating the need for specialized technical skill/knowledge and specialized equipment to perform the installation process and providing a less labor intensive and less costly installation process. There is also a need in the art for an under beam lift assembly that includes structure that enables it to be attached to the axle/suspension system of the heavy-duty vehicle in a manner such that the under beam lift assembly pivots in an axis different than the axis of the pivotal connection of the beam of the suspension assembly of the axle/suspension system to the hanger of the axle/suspension system to significantly minimize and/or eliminate stress on the pivotal connection between the beam and the hanger when the under beam lift assembly is actuated. This mounting structure thereby protects the integrity of components of the pivotal connection between the beam and the hanger, such as the bushing and/or pivot bolt of the bushing assembly, during actuation of the under beam lift assembly. Moreover, there is a need in the art for an under beam lift assembly that is configured such that there is no rigid attachment of the under beam lift assembly to the beam of the suspension assembly of the axle/suspension system to prevent components of the under beam lift assembly from articulating with the beam during operation of the heavy-duty vehicle when the under beam lift assembly is unactuated, thereby reducing stress on the under beam lift assembly and/or beam during such operation of the heavy-duty vehicle. Furthermore, there is a need in the art for an under beam lift assembly that includes a self-retaining vacuum retention system for a lift air chamber of the under beam lift assembly, which holds the under beam lift assembly in a retracted state when not actuated to minimize the potential for damage to components of the under beam lift assembly during axle/suspension system rebound. In addition, there is a need in the art for an under beam lift assembly that is configured such that it can be mounted to the heavy-duty vehicle at different points during the manufacturing process of the axle/suspension system and/or heavy-duty vehicle, such as before or after the beam of the suspension assembly of the axle/suspension system is attached to the hanger of the axle/suspension system or before/after the axle/suspension system is attached to the frame of the heavy-duty vehicle, thereby providing greater installation flexibility and/or enabling servicing of components of the lift axle/suspension system once installed. Furthermore, there is a need in the art for an under beam lift assembly that can be fully assembled into one packaged unit prior to installation on the axle/suspension system, thereby reducing installation complexity.

The under beam lift assembly for heavy-duty vehicles of the disclosed subject matter satisfies these needs and overcomes the above-described disadvantages, drawbacks, and limitations of prior art under beam lift assemblies described above, and will now be described.

BRIEF SUMMARY OF THE SUBJECT DISCLOSURE

An objective of the disclosed subject matter is to provide an under beam lift assembly for heavy-duty vehicles that eliminates the need for welds to attach the under beam lift assembly to an axle/suspension system of the heavy-duty vehicle, thereby eliminating the need for specialized technical skill/knowledge and specialized equipment to perform the installation process and providing a less labor intensive and less costly installation process.

Another objective of the disclosed subject matter is to provide an under beam lift assembly for heavy-duty vehicles that includes structure that significantly minimizes or eliminates stress on the pivotal connection between a beam of a suspension assembly and a hanger of the axle/suspension system when the under beam lift assembly is actuated, thereby protecting the integrity of components of the pivotal connection of the beam to the hanger during actuation of the under beam lift assembly.

Yet another objective of the disclosed subject matter is to provide an under beam lift assembly for heavy-duty vehicles that does not require rigid attachment of the under beam lift assembly to the beam of the suspension assembly of the axle/suspension system, thereby preventing components of the under beam lift assembly from articulating with the beam during operation of the heavy-duty vehicle when the under beam lift assembly is unactuated and reducing stress on components of the under beam lift assembly and/or suspension assembly during such operation of the heavy-duty vehicle.

Another objective of the disclosed subject matter is to provide an under beam lift assembly for heavy-duty vehicles that can be maintained in a fully retracted state when not actuated, thereby minimizing the potential for damage to components of the under beam lift assembly and/or beam of the suspension assembly of the axle/suspension system during axle/suspension system rebound.

Yet another objective of the disclosed subject matter is to provide an under beam lift assembly for heavy-duty vehicles that is configured such that it can be mounted to the axle/suspension system of the heavy-duty vehicle at different points during the manufacturing process of the axle/suspension system and/or the heavy-duty vehicle, thereby providing greater installation flexibility and/or enabling independent servicing or replacement of components of the under beam lift assembly and/or axle/suspension system.

Another objective of the disclosed subject matter is to provide an under beam lift assembly for heavy-duty vehicles that can be fully assembled into one packaged unit prior to installation on the axle/suspension system, thereby reducing installation complexity.

These objectives and others are achieved by the under beam lift assembly for heavy-vehicles of the disclosed subject matter, which includes: a first portion removably connected to the heavy-duty vehicle; a second portion pivotally connected to the first portion, the second portion pivoting in an axis different than an axis of a pivotal connection between a suspension assembly and a hanger of an axle/suspension system of the heavy-duty vehicle; a lift element operatively connected to the second portion, wherein actuation of the lift element causes arcuate upward movement of the suspension assembly via contact with the second portion; and wherein the under beam lift assembly is free of contact with the pivotal connection between the suspension assembly and the hanger.

BRIEF DESCRIPTION OF THE SEVERAL VIEWS OF THE DRAWINGS

An exemplary embodiment of the disclosed subject matter, illustrative of the best mode in which Applicant has contemplated applying the principles of the disclosed subject matter, is set forth in the following description and is shown in the drawings.

FIG. 8 is an elevational view of the exemplary embodiment under beam lift assembly and lift axle/suspension system shown in FIG. 3, viewed looking in an inboard direction, showing the under beam lift assembly unactuated and a lift air chamber of the under beam lift assembly deflated such that the lift bracket of the under beam lift assembly is removed from contact with the beam of the driver-side suspension assembly of the lift axle/suspension system, and thus lower the associated wheels (not shown) into contact with the ground;

Similar numerals and characters refer to similar parts throughout the drawings.

DETAILED DESCRIPTION OF THE DISCLOSED SUBJECT MATTER

Figure 1:
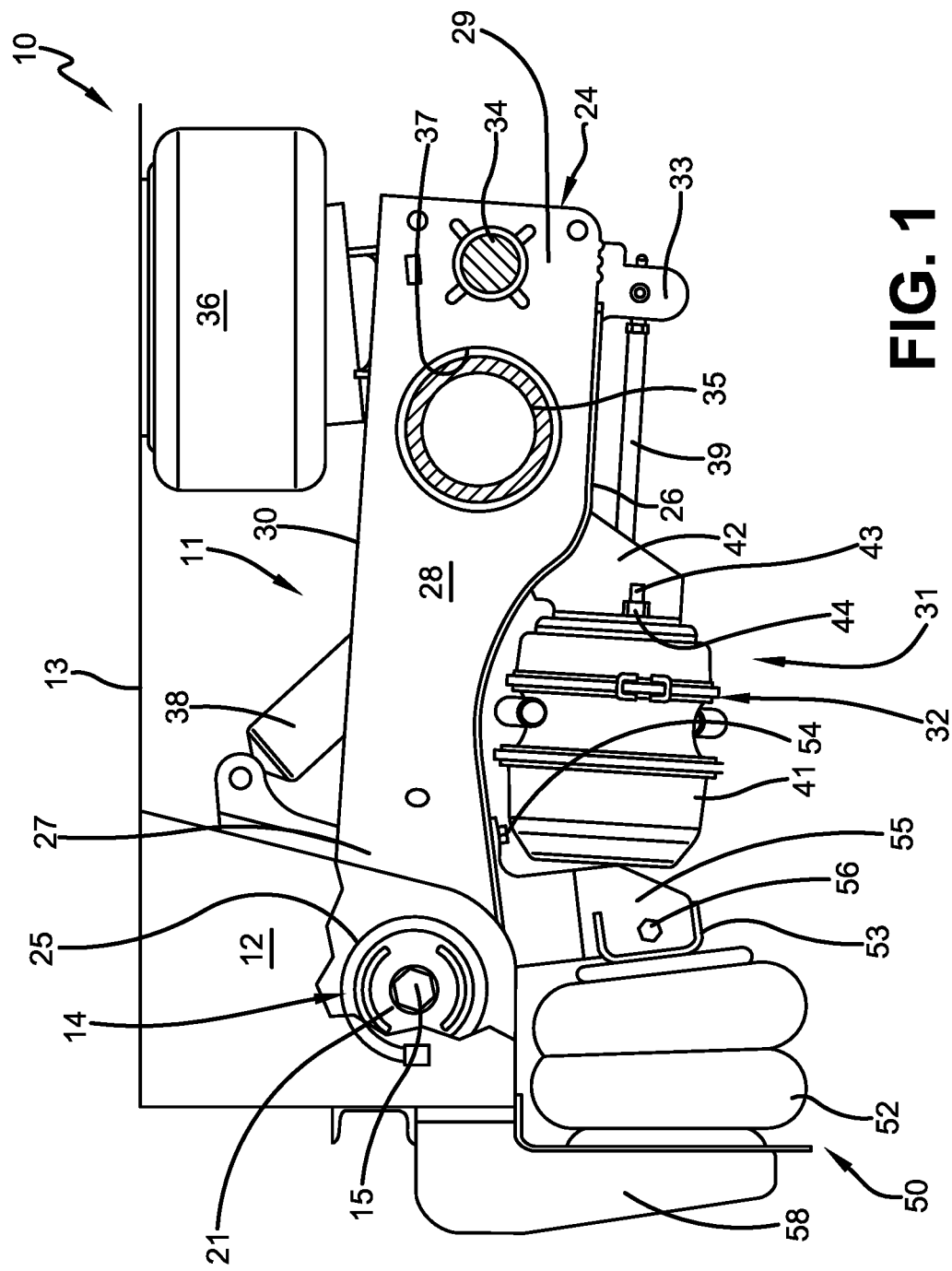
FIG. 1 is an elevational view of a prior art under beam lift assembly mounted on a trailing arm rigid beam-type lift axle/suspension system, viewed looking in an inboard direction, with portions broken away and certain components shown in cross-section, showing the under beam lift assembly attached to a driver-side hanger of the lift axle/suspension system and a beam of a driver-side suspension assembly of the lift axle/suspension system, such that it is positioned beneath the hanger and the beam.
Figure 2:
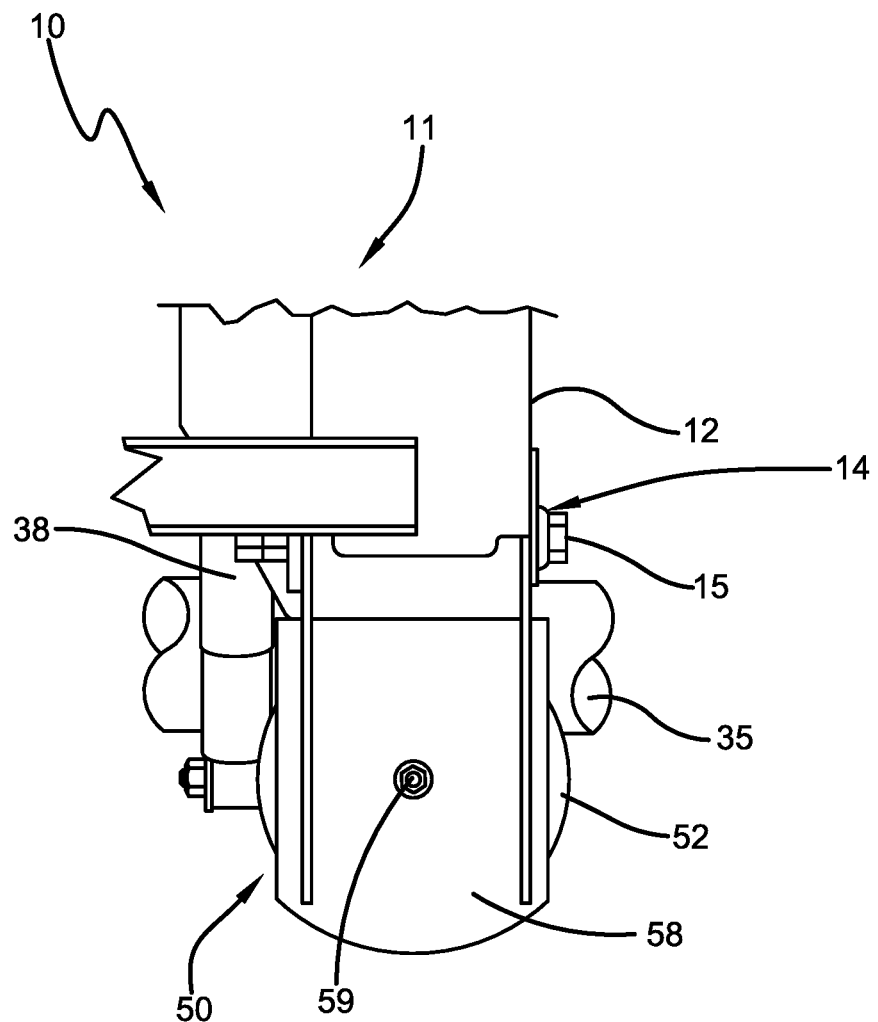
FIG. 2 is a fragmentary elevational view of the lift axle/suspension system and prior art under beam lift assembly shown in FIG. 1, viewed looking in a rearward direction.

In order to better understand the under beam lift assembly for heavy-duty vehicles of the disclosed subject matter and the environment in which it operates, a prior art under beam lift assembly utilized in conjunction with a trailing arm air-ride rigid beam-type lift axle/suspension system for a heavy-duty vehicle 10, is indicated generally at 50, is shown in FIGS. 1-2, and will be described in detail below. Lift axle/suspension system 10 generally includes a pair of suspension assemblies 11. Each suspension assembly 11 is pivotally connected to and suspended from a respective one of a pair of hangers 12 of lift axle/suspension system 10, which are attached to and depend from respective main members 13 (FIG. 1) of the primary frame (not shown) of the heavy-duty vehicle (not shown). Inasmuch as lift axle/suspension system 10 includes generally identical suspension assemblies 11 pivotally connected to and suspended from respective hangers 12, for purposes of conciseness and clarity only one of the suspension assemblies will be described herein.

With reference to FIG. 1, suspension assembly 11 includes a rigid trailing arm beam 24. Beam 24 includes a pair of side walls 28 (only one shown) that are integrally formed with a top wall 30 of the beam to form an upside-down generally U-shaped structure. A bottom plate 26 extends between and is rigidly attached to the lower ends of side walls 28 by suitable means, such as welds. Beam 24 includes a front portion 27 that includes a bushing assembly mounting tube 25 rigidly attached to the front ends of side walls 28, top wall 30, and bottom plate 26 by suitable means, such as welds. A bushing 21 of a bushing assembly 14 is disposed and secured within mounting tube 25, and facilitates pivotal connection of beam 24 to hanger 12 via a pivot bolt 15 and washers (not shown) of the bushing assembly in a manner known in the art. Bushing 21 is of the type having multifunctional characteristics. More specifically, the multifunctional characteristics include required load and deflection ratios, or static rates, of varying levels in different directions for heavy-duty vehicle axle/suspension system applications. The bushing static rate is stiff in the horizontal radial direction, so that lift axle/suspension system 10 remains substantially perpendicular to the direction of movement of the heavy-duty vehicle despite horizontal loading which may be placed on the lift axle/suspension system, and relatively soft in the vertical radial direction, to enable the lift axle/suspension system and bushing 21 to absorb vertical loading shocks and provide a smooth ride for the vehicle occupants and any cargo carried by the vehicle.

With continued reference to FIG. 1, side walls 28 of beam 24 are formed with transversely aligned openings 37 (only one shown), through which an axle 35 is disposed. Axle 35 is rigidly attached to side walls 28, and thus beam 24, via suitable means, such as welds. Beam 24 also includes a rear portion 29. An air spring 36 is attached to top wall 30 of beam 24 at rear portion 29 and extends between the top wall and a respective main member 13 of the frame of the heavy-duty vehicle, to which it is attached by suitable means, such as fasteners. A set of wheels are mounted on respective wheel hubs (not shown) of wheel end assemblies (not shown) that are rotatably mounted on respective ends of axle 35 in a manner known in the art. A shock absorber 38 (FIGS. 1-2) extends between and is attached to the inboard side wall 28 of each beam 24 and its respective hanger 12.

For purposes of completeness, lift axle/suspension system 10 is shown with components of a drum brake assembly 32 of a drum brake system 31 incorporated into suspension assembly 11, which provides braking to the wheel associated with the suspension assembly. Drum brake assembly 32 includes a dual brake chamber 41 attached to a bracket 42 via fasteners 43 (only one shown) incorporated into the dual brake chamber, which are threadably engaged by nuts 44 (only one shown) to secure the dual brake chamber to the bracket. Bracket 42 in turn is rigidly attached to and depends from bottom plate 26 of beam 24 of suspension assembly 11. A piston rod 39 of dual brake chamber 41 is disposed through an opening (not shown) formed in bracket 42 and is pivotally attached to a slack adjuster 33, which in turn is mounted on a cam shaft 34 of drum brake assembly 32 via a splined connection to provide for transfer of in-line loads from the brake chamber piston into a torsional load on the cam shaft.

With reference to FIGS. 1-2, lift axle/suspension system 10 employs prior art under beam lift assembly 50 with each suspension assembly 11 of the lift axle/suspension system to enable axle 35 to be lifted or raised, such that the associated wheels can be lifted from contact with the ground, when desired. Inasmuch as prior art under beam lift assemblies 50 are similar, for purposes of conciseness and clarity, only one of the under beam lift assemblies will be described herein. Prior art under beam lift assembly 50 includes a support member 58. Support member 58 is a vertically extending member which is immovably attached to a front surface of hanger 12, such as by welds and/or fasteners. Support member 58 enables attachment of an elastomeric bellows-type lift air chamber 52 of prior art under beam lift assembly 50, which is in fluid communication with an air source (not shown) located on the heavy-duty vehicle, such as an air tank, via one or more pneumatic lines (not shown). More specifically, a fastener 59, such as a threaded bolt, is incorporated into a front end of lift air chamber 52 and passes through an opening (not shown) formed in support member 58. A nut (not shown) threadably engages fastener 59 to removably mount lift air chamber 52 to support member 58. A rear end of lift air chamber 52 is immovably attached to a short, transversely extending U-shaped channel 53 by a pair of transversely-spaced fasteners (not shown). U-shaped channel 53 in turn is mounted on a bracket 55 by fasteners 56 (only one shown). Bracket 55 in turn is rigidly attached to bottom plate 26 of beam 24 by fasteners 54 and/or one or more welds (not shown).

During operation of prior art under beam lift assembly 50, as pressurized air from the air source located on the heavy-duty vehicle is introduced into each lift air chamber 52, and air is simultaneously released from air springs 36 of suspension assemblies 11 of lift axle/suspension system 10, the lift air chambers expand rearwardly from their attachments to support members 58, applying a rearward force on brackets 55, which causes arcuate upward movement of beams 24 about their pivotal connections to hangers 12. This in turn lifts axle 35, and thus lifts the wheels associated with lift axle/suspension system 10 from the ground, when desired. Conversely, when pressurized air within lift air chambers 52 is exhausted, and air is simultaneously supplied to air springs 36 via the air source, the lift air chambers collapse frontwardly towards their attachment to support members 58, which causes arcuate downward movement of beams 24 about their pivotal connections to hangers 12 to lower axle 35, and thus lower the associated wheels to contact the ground.

While generally suitable for its intended purpose, prior art under beam lift assembly 50 has certain disadvantages, drawbacks, and limitations. For example, prior art under beam lift assembly 50 utilizes one or more welds and/or fasteners 54 to rigidly attach components of the under beam lift assembly to lift axle/suspension system 10. More specifically, prior art under beam lift assembly 50 utilizes one or more welds and/or fasteners 54 to rigidly attach support member 58 of the under beam lift assembly to the front surface of hanger 12 and/or rigidly attach bracket 55 of the under beam lift assembly to bottom plate 26 of beam 24 of suspension assembly 11. When welds are utilized to attach components of prior art under beam lift assembly 50 to lift axle/suspension system 10, the overall installation process is relatively labor intensive and costly as compared to an installation configuration and process that does not require welds, such as via the use of mechanical fasteners.

Moreover, prior art under beam lift assembly 50 is often an option that is incorporated into the heavy-duty duty vehicle after an axle/suspension system is purchased to convert the axle/suspension system to a lift axle/suspension system, such as lift axle/suspension system 10, and thus must be installed by the manufacturer of the heavy-duty vehicle or fleet. Not all vehicle manufacturers or fleets are equipped to perform the installation of prior art under beam lift assembly 50. More specifically, the welding procedures and specifications for attaching support member 58 of prior art under beam lift assembly 50 to the front surface of hanger 12 and/or bracket 55 of the under beam lift assembly to beam 24 of suspension assembly 11 require a substantial amount of specialized technical skill/knowledge and specialized equipment to perform. Some heavy-duty vehicle manufacturers or fleets may not have personnel with such technical skill/knowledge and/or lack the specialized equipment to execute the installation.

Furthermore, prior art under beam lift assembly 50 is mounted to lift axle/suspension system 10 such that it pivots about the same axis as the pivotal connection of beam 24 of suspension assembly 11 of the lift axle/suspension system to hanger 12 of the lift axle/suspension system. This structural arrangement thus employs bushing assembly 14 used to pivotally connect beam 24 to hanger 12 to react the load of lift axle/suspension system 10 when under beam lift assembly 50 is actuated and the lift axle/suspension system is lifted such that the associated wheels are lifted from contact with the ground. This type of connection and operation increases stress on components of bushing assembly 14, such as bushing 21 and pivot bolt 15, when prior art under beam lift assembly 50 is actuated and lift axle/suspension system 10 and the associated wheels are lifted, thereby potentially increasing stress on components of the bushing assembly, potentially reducing the life of the components, and/or compromising the pivotal connection of beam 24 of suspension assembly 11 to hanger 12, which in turn can potentially result in required maintenance of the heavy-duty vehicle and vehicle downtime.

Moreover, prior art under beam lift assembly 50 is rigidly attached to beam 24 of suspension assembly 11 of lift axle/suspension system 10 via fasteners 54 and/or one or more welds. Consequently, components of prior art under beam lift assembly 50, including lift air chamber 52 and bracket 55, articulate with beam 24 during normal operation of the lift axle/suspension system 10, i.e., when the under beam lift assembly is unactuated and the associated wheels of the lift axle/suspension system are in contact with the ground. This undesirably increases stress on components of prior art under beam lift assembly 50, such as lift air chamber 52 and bracket 55, and/or beam 24 of suspension assembly 11 during normal articulation of the beam when the under beam lift assembly is unactuated, thereby potentially decreasing life of components of the under beam lift assembly and/or beam, resulting in increased maintenance of the heavy-duty vehicle and vehicle downtime.

In addition, prior art under beam lift assembly 50 is configured such that it does not provide desirable installation flexibility and/or enable servicing of components of lift axle/suspension system 10 and/or the under beam lift assembly once installed. More specifically, because prior art under beam lift assembly 50 utilizes one or more welds to rigidly attach bracket 55 to beam 24 of suspension assembly 11 of the lift axle/suspension system, the bracket typically must be attached to the beam before the beam is pivotally connected to the hanger. Moreover, because support member 58 of under beam lift assembly 50 is rigidly attached to the front surface of hanger 12 via one or more welds and/or bracket 55 of the under beam lift assembly is rigidly attached to beam 24 of suspension assembly 11 via one or more welds when installed on lift axle/suspension system 10, the beam cannot be removed from lift axle/suspension system 10 via disconnection of the pivotal attachment of the beam to the hanger for servicing components of the lift axle/suspension system, such as components of bushing assembly 14, without disconnecting components of the under beam lift assembly from each other, and/or components of the under beam lift assembly cannot be easily serviced or replaced, such as support member 58 and/or bracket 55.

In addition, because prior art under beam lift assembly 50 utilizes one or more welds to rigidly attach bracket 55 to beam 24 of suspension assembly 11 of lift axle/suspension system 10, the beam typically must be removed from the lift axle/suspension system to enable the bracket to be removed and replaced, which also requires disconnection of certain components of the under beam lift assembly, such as disconnection of lift air chamber 52 from U-shaped channel 53 mounted on a bracket 55. The exemplary embodiment under beam lift assembly for heavy-duty vehicles of the disclosed subject matter overcomes the above referenced disadvantages, drawbacks, and limitations, and will now be described.

Figure 3:
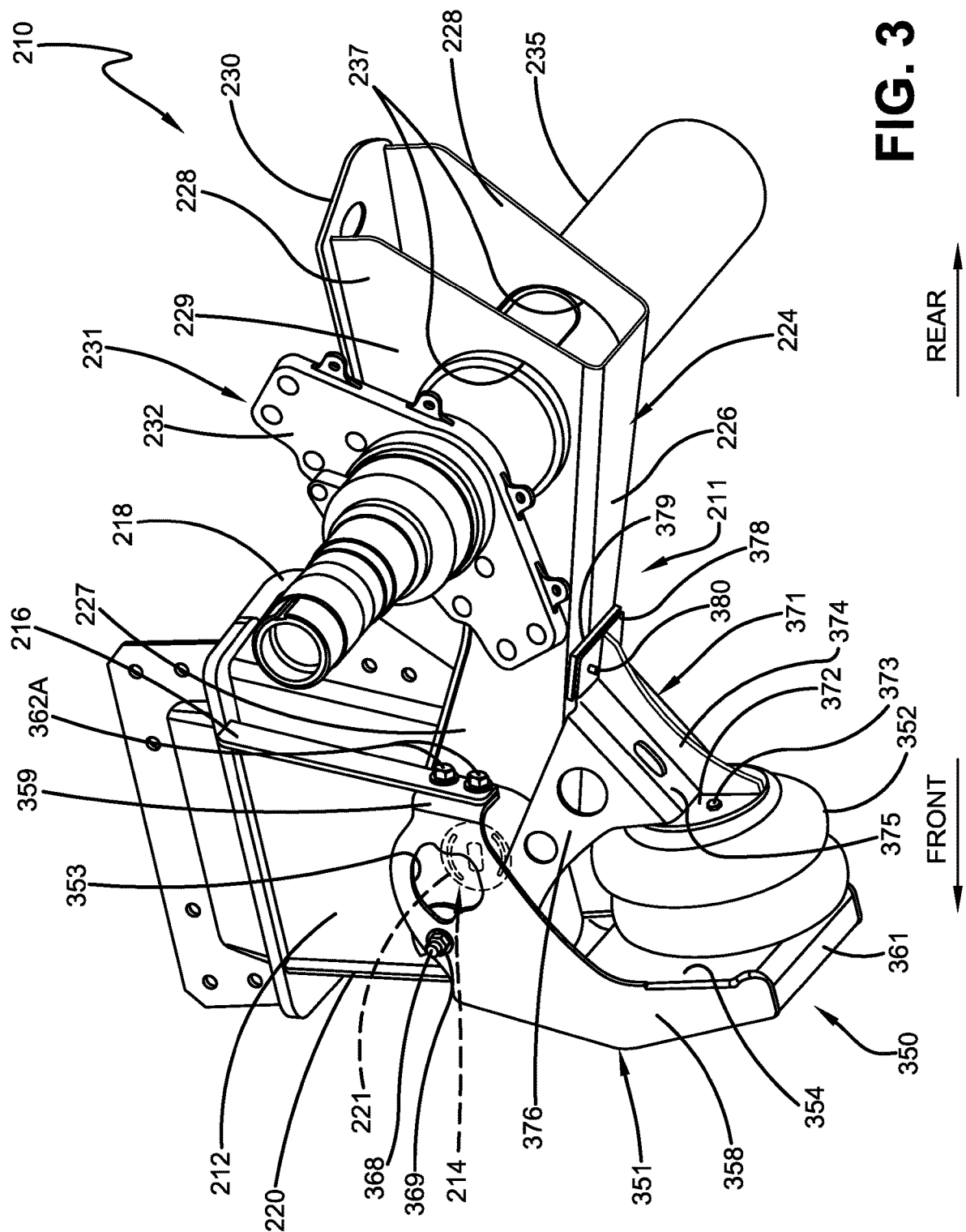
FIG. 3 is a fragmentary perspective view of an exemplary embodiment under beam lift assembly for heavy-duty vehicles of the disclosed subject matter, shown removably mounted to a driver-side hanger of a trailing arm rigid beam-type lift axle/suspension system for a heavy-duty vehicle, viewed looking in an inboard direction, with a portion of an axle shown captured by a beam of a driver-side suspension assembly of the lift axle/suspension system.
Figure 5:
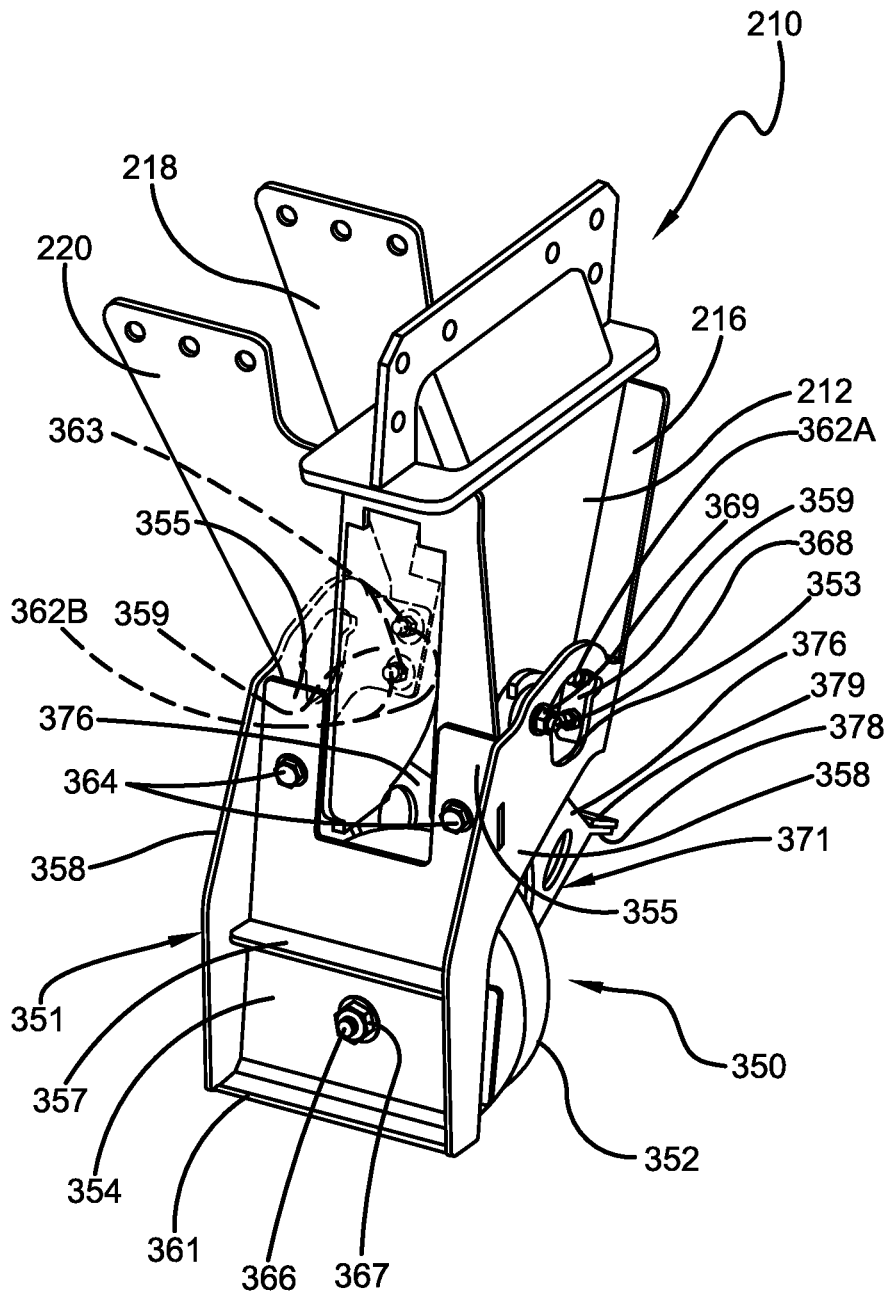
FIG. 5 is a perspective view of the hanger and exemplary embodiment under beam lift assembly shown in FIG. 3, viewed looking in a rearward direction.
Figure 6:
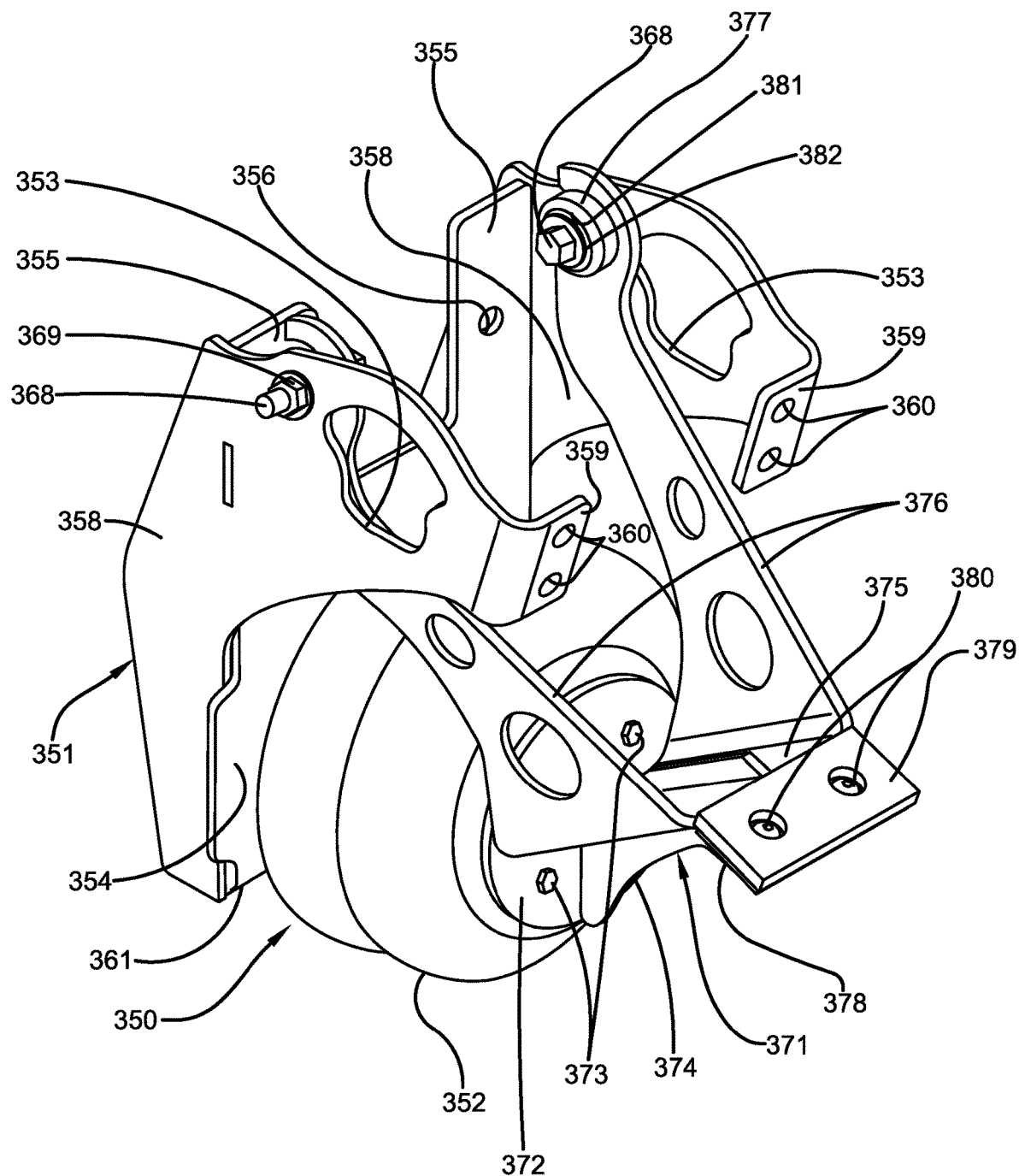
FIG. 6 is an enlarged perspective view of the exemplary embodiment under beam lift assembly shown in FIG. 3, viewed looking in an inboard direction, showing the under beam lift assembly removed from the hanger.
Figure 7:
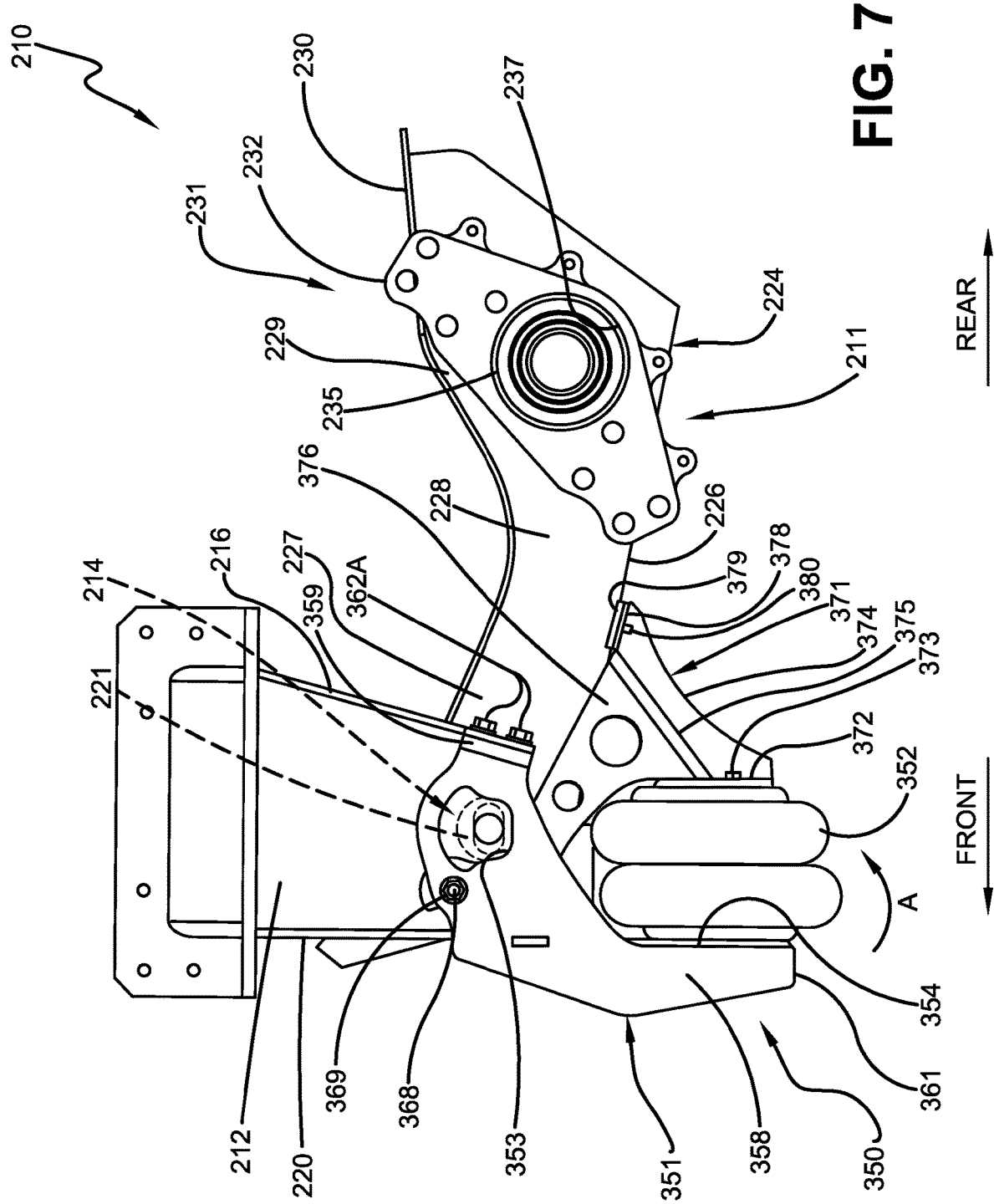
FIG. 7 is an elevational view of the exemplary embodiment under beam lift assembly and lift axle/suspension system shown in FIG. 3, viewed looking in an inboard direction, showing the under beam lift assembly actuated and a lift air chamber of the under beam lift assembly inflated such that a lift bracket of the under beam lift assembly is in contact with a beam of the driver-side suspension assembly during operation of the under beam lift assembly to lift the axle, and thus lift the associated wheels (not shown) from contact with the ground.

An exemplary embodiment under beam lift assembly for heavy-duty vehicles of the disclosed subject matter is shown in FIGS. 3-8, and is indicated generally at 350. Exemplary embodiment under beam lift assembly 350 is shown utilized with a trailing arm rigid beam-type lift axle/suspension system 210 (FIGS. 3-5 and 7-8). It is to be understood that exemplary embodiment under beam lift assembly 350 can be utilized with axle/suspension systems with components and structures different than that of lift axle/suspension system 210 without affecting the overall concept or operation of the disclosed subject matter. With reference to FIGS. 3 and 7-8, lift axle/suspension system 210 is generally similar in structure and function to lift axle/suspension system 10 shown in FIGS. 1-2 and described above, and generally includes a pair of suspension assemblies 211. Each suspension assembly 211 is pivotally connected to and suspended from a respective one of a pair of hangers 212 (FIGS. 3-5 and 7-8) of lift axle/suspension system 210, which in turn are attached to and depend from respective main members (not shown) of a frame (not shown) of the heavy-duty vehicle. Inasmuch as axle/suspension system 210 includes generally identical suspension assemblies 211 pivotally connected to and suspended from respective hangers 212, for purposes of conciseness and clarity only one of the suspension assemblies will be described herein.

Suspension assembly 211 includes a trailing arm beam 224. Beam 224 includes a pair of side walls 228 that are integrally formed with a bottom wall 226 of the beam to form a generally U-shaped structure. A top plate 230 extends between and is rigidly attached to the upper ends of side walls 228 by any suitable means, such as welds. Beam 224 includes a front portion 227 with a bushing assembly mounting tube (not shown), which is rigidly attached to the front ends of side walls 228, top plate 230, and bottom wall 226 by any suitable means, such as welds. With reference to FIGS. 3 and 7-8, a bushing 221 of a bushing assembly 214 is disposed within the mounting tube, and facilitates pivotal connection of beam 224 to hanger 212 via a pivot bolt (not shown) and washers (not shown) of the bushing assembly in a manner known in the art. Bushing 221 is of the type having multifunctional characteristics.

With reference to FIGS. 3 and 7-8, side walls 228 of beam 224 are formed with transversely aligned openings 237, through which an axle 235 is disposed. Axle 235 is rigidly attached to side walls 228, and thus beam 224, via any suitable means, such as welds. Beam 224 also includes a rear portion 229. An air spring (not shown) is attached to top plate 230 of beam 224 at rear portion 229 and extends between the top plate and the respective main member of the frame of the heavy-duty vehicle, to which it is attached by any suitable means, such as fasteners. A set of wheels (not shown) are mounted on respective wheel hubs (not shown) of wheel end assemblies (not shown) that are rotatably mounted on respective ends of axle 235 in a manner known in the art. For purposes of completeness, lift axle/suspension system 210 is shown with a torque plate 232 of an air disc brake system 231 rigidly attached to axle 235, which is utilized in conjunction with other components of the air disc brake system to provide braking to the heavy-duty vehicle in a manner known in the art.

Figure 4:
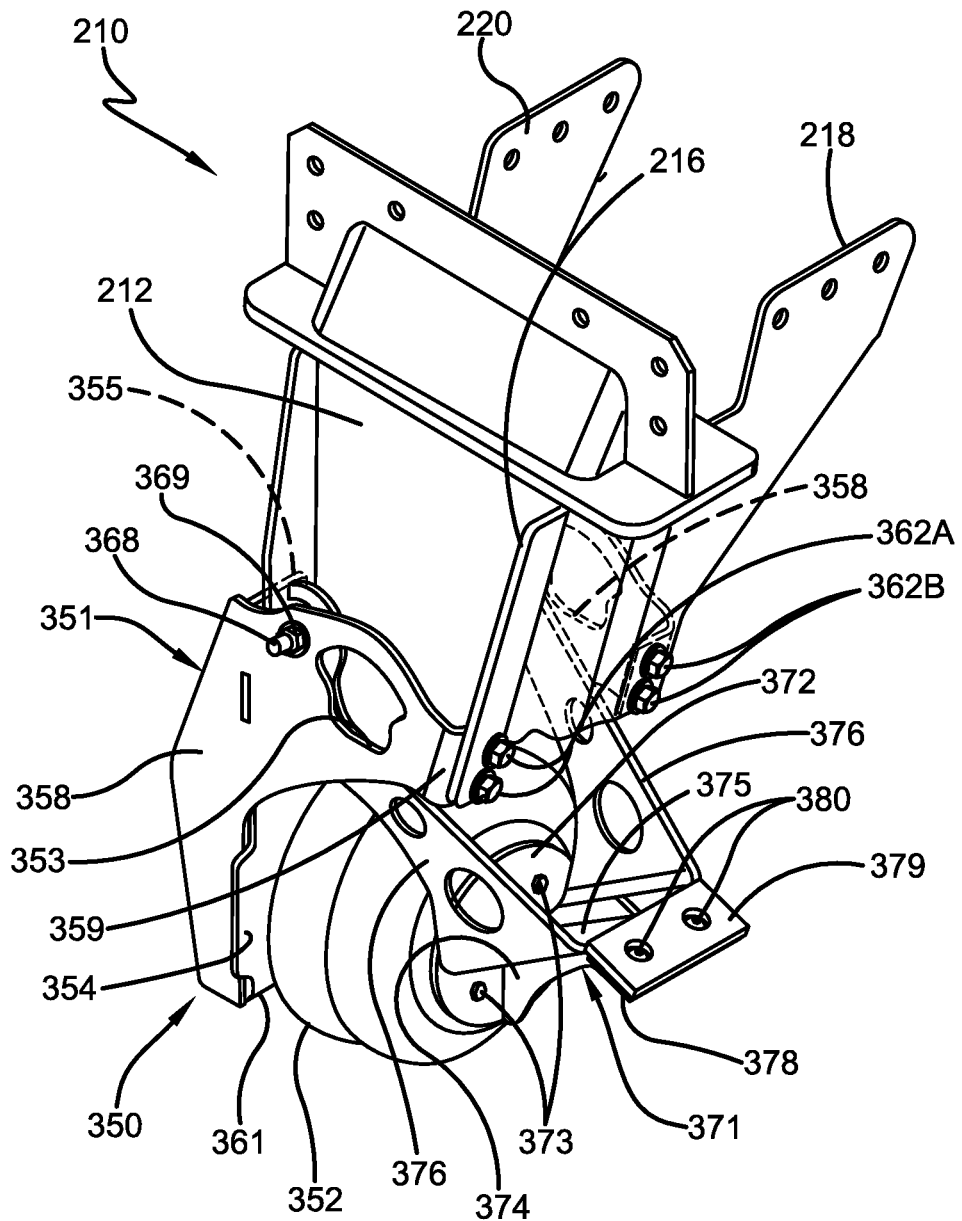
FIG. 4 is a perspective view of the hanger and exemplary embodiment under beam lift assembly shown in FIG. 3, viewed looking in an inboard direction.

With reference to FIGS. 3 and 7-8, exemplary embodiment under beam lift assembly 350 of the disclosed subject matter is incorporated into lift axle/suspension system 210 and enables axle 235 to be lifted, and thus enables the associated wheels to be selectively lifted from contact with the ground under certain operating conditions of the heavy-duty vehicle. With reference to FIGS. 3-8, under beam lift assembly 350 includes a mounting bracket 351. Mounting bracket 351 includes a multi-component construction formed of a suitable rigid material, such as steel. More specifically, mounting bracket 351 includes a generally flat rear plate 354. Rear plate 354 is integrally formed with a bottom wall 361 that extends frontwardly from the bottom of the rear plate. With reference to FIGS. 4-6, rear plate 354 is also formed with a pair of upwardly extending mounting arms 355. With reference to FIG. 6, each mounting arm 355 is formed with an opening 356 (only one shown), the importance of which will be described below. With reference to FIGS. 3-8, mounting bracket 351 further includes a pair of generally inverted L-shaped side plates 358. Side plates 358 are welded or otherwise rigidly attached to respective inboard and outboard edges of rear plate 354. Each side plate 358 is formed with an opening (not shown) located near the top of the side plate and an access cutout 353 positioned rearward of the opening, the importance of which will also be described below. Side plates 358 are each formed with an attachment lip 359 that extends inboardly or outboardly from the outboard and inboard side plates, respectively. With particular reference to FIG. 6, each attachment lip 359 is formed with a pair of vertically-spaced openings 360, the importance of which will also be described below. With reference to FIG. 5, mounting bracket 351 further includes a cross support member 357. Cross support member 357 is welded or otherwise rigidly attached to the front side of rear plate 354 of mounting bracket 351 and extends between side plates 358 of the mounting bracket, to which it is also welded or otherwise rigidly attached. Cross support member 357 provides transverse reinforcement to mounting bracket 351.

With reference to FIGS. 3-5 and 7-8, mounting bracket 351 enables exemplary embodiment under beam lift assembly 350 to be removably attached to lift axle/suspension system 210 of the heavy-duty vehicle. More specifically, openings 356 (FIG. 6) of mounting arms 355 (FIGS. 4-6) of rear plate 354 (FIGS. 3-8) longitudinally align with respective openings (not shown) formed in a front cross member support 220 (FIGS. 3-5 and 7-8) of hanger 212 (FIGS. 3-5 and 7-8). With reference to FIG. 5, a front mounting bolt 364 is disposed through each aligned opening 356 (FIG. 6) of mounting arm 355 (FIGS. 4-6) of rear plate 354 (FIGS. 3-8) and the respective opening formed in front cross member support 220 of hanger 212, which threadably engages a nut (not shown) to secure the rear plate to hanger 212. With reference to FIGS. 3-5 and 6-8, openings 360 (FIG. 6) of attachment lip 359 of the outboard side plate 358 of mounting bracket 351 longitudinally align with a pair of respective openings (not shown) formed in a flange 216 (FIGS. 3-5 and 7-8) of hanger 212 that extends outboardly from the rear of the hanger. With reference to FIGS. 3-4 and 7-8, a pair of rear mounting bolts 362A are disposed through respective aligned openings formed in flange 216 of hanger 212 and openings 360 (FIG. 6) of attachment lip 359 of the outboard side plate 358, which threadably engage nuts 363 (FIG. 5) to secure the outboard side plate to the hanger. With reference to FIGS. 4-5, openings 360 (FIG. 6) of attachment lip 359 of the inboard side plate 358 of mounting bracket 351 longitudinally align with a pair of respective openings (not shown) formed in a rear cross member support 218 (FIGS. 3-5) of hanger 212. A pair of rear mounting bolts 362B are disposed through respective aligned openings formed in attachment lip 359 of the inboard side plate 358 and the openings formed in rear cross member support 218 of hanger 212, which threadably engage nuts 363 (FIG. 5) to secure the inboard side plate to the hanger. In this manner, mounting bracket 351, and thus under beam lift assembly 350, is removably attached to lift axle/suspension system 210, and thus the heavy-duty vehicle, without welds. It is to be understood that mounting bracket 351 of under beam lift assembly 350 can include a different configuration, structure, and/or components than that shown and described without affecting the overall concept or operation of the disclosed subject matter.

With reference to FIGS. 3-8, exemplary embodiment under beam lift assembly 350 further includes a lift bracket 371. Lift bracket 371 includes a multi-component construction formed of a suitable rigid material, such as steel. More specifically, and with reference to FIGS. 3-4 and 6-8, lift bracket 371 includes a generally flat rectangular rear wall 375. With reference to FIGS. 3-8, lift bracket 371 further includes a pair of transversely-spaced side arms 376 that are integrally formed with respective inboard and outboard edges of rear wall 375 and extend generally frontwardly from the rear plate. With reference to FIG. 6, each side arm 376 is formed with a boss 377 (only one shown) adjacent its front end, with the boss of the inboard side arm extending outboardly from the inboard side arm and the boss of the outboard side arm extending inboardly from the outboard side arm. Each boss 377 is formed with an opening 381 (only one shown) extending through the boss, through which a pivot bushing 382 (only one shown) is disposed and secured by suitable means, such as a press-fit, the importance of which will be described below.

With reference to FIGS. 3-4 and 6-8, lift bracket 371 further includes a flat and generally circular lift air chamber mounting plate 372. The bottom edge of rear wall 375 and the bottom front edges of side arms 376 are rigidly attached to the rear surface of mounting plate 372 by any suitable means, such as welds. Lift bracket 371 includes a support member 374 that is rigidly attached to the rear surface of mounting plate 372 by suitable means, such as welds, and extends vertically along and is rigidly attached to the rear surface of rear wall 375 by suitable means, such as welds. With reference to FIGS. 3-8, lift bracket 371 also includes a flat and generally rectangular beam contact plate 378 that is rigidly attached to the top edge of support member 374 and the top edge of rear wall 375 by suitable means, such as welds. A pad 379 formed of an elastomeric material, such as rubber, is attached to the top surface of beam contact plate 378 via a pair of fasteners 380 (FIGS. 3-4 and 6-8).

With reference to FIGS. 3-8, lift bracket 371 of exemplary embodiment under beam lift assembly 350 is pivotally connected to mounting bracket 351 of the under beam lift assembly. More specifically, side arms 376 of lift bracket 371 are positioned slightly transversely inward of side plates 358 of mounting bracket 351 such that the openings (not shown) formed in the side plates of the mounting bracket, frontward of access cutouts 353, align transversely with respective openings (not shown) formed in pivot bushings 382 disposed in and secured within openings 381 of bosses 377 of the side arms of the lift bracket. Pivot bolts 368 are disposed through respective transversely aligned openings of pivot bushings 382 and the openings of side plates 358 of mounting bracket 351 positioned frontward of access cutouts 353 and threadably engage respective nuts 369 to pivotally connect side arms 376 of lift bracket 371 to the side plates of the mounting bracket. In this manner, lift bracket 371 of under beam lift assembly 350 is capable of pivoting arcuately upwardly and downwardly relative to mounting bracket 351 of the under beam lift assembly, the importance of which will be described below. It is to be understood that lift bracket 371 of under beam lift assembly 350 can include a different configuration, structure, and/or components than that shown and described without affecting the overall concept or operation of the disclosed subject matter.

Figure 10:
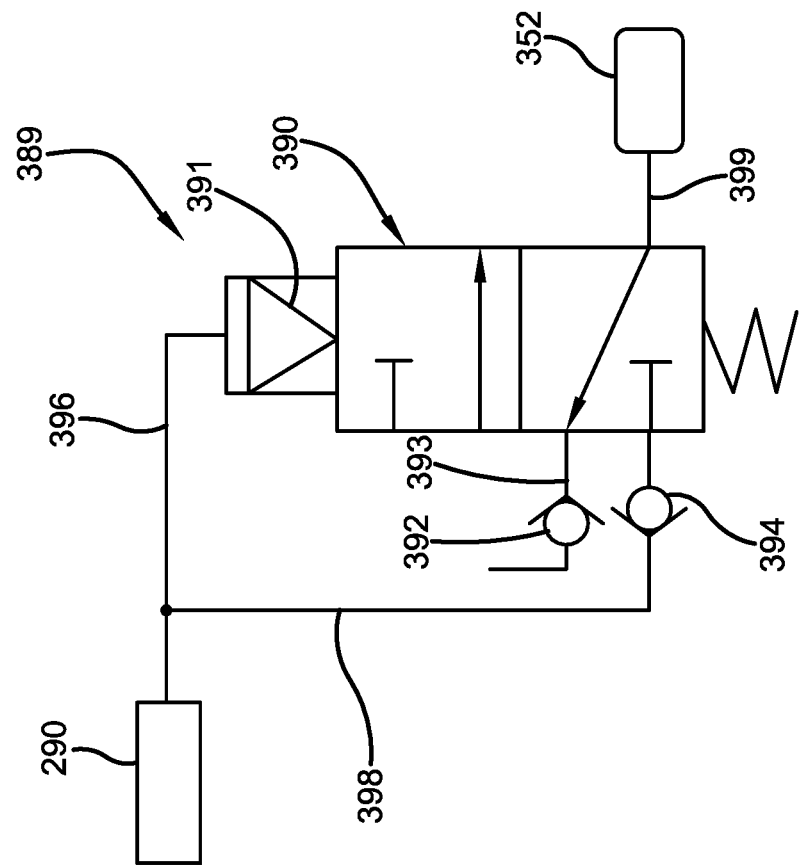
FIG. 10 is a schematic diagram of the self-retaining vacuum retention system of the exemplary embodiment under beam lift assembly shown in FIG. 3, showing the air piloted check valve of the vacuum retention system in an unpiloted state such that the under beam lift assembly is unactuated and the lift air chamber is exhausted and under vacuum, and the lift bracket of the under beam lift assembly no longer contacts the beam of the driver-side suspension assembly of the lift axle/suspension system and is maintained removed from and does not interfere with normal articulation of the beam during rebound of the lift axle/suspension system during operation of the heavy-duty vehicle.
Figure 9:
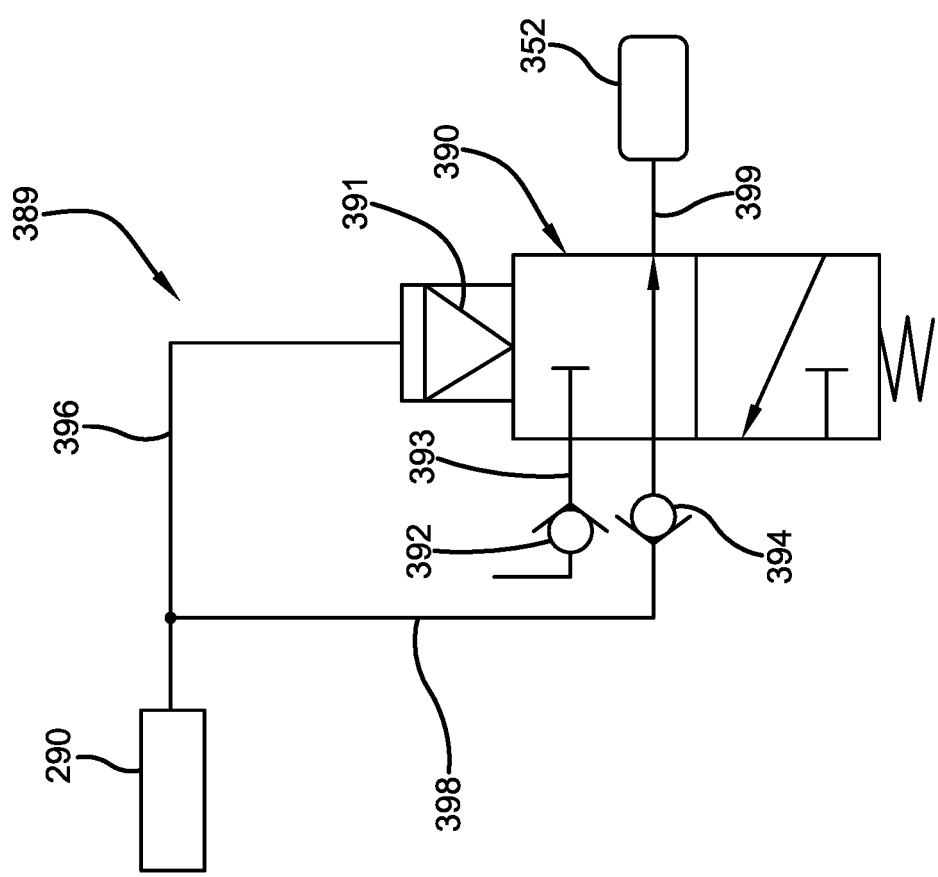
FIG. 9 is a schematic diagram of a self-retaining vacuum retention system of the exemplary embodiment under beam lift assembly shown in FIG. 3, showing an air piloted check valve of the vacuum retention system in a piloted state to actuate the under beam lift assembly and allow inflation of the lift air chamber of the under beam lift assembly such that the lift bracket contacts and lifts the beam of the driver-side suspension assembly of the lift axle/suspension system, and thus lifts the axle and associated wheels of the heavy-vehicle from the ground surface.

With reference to FIGS. 3-8, exemplary embodiment under beam lift assembly 350 includes a lift air chamber 352. Lift air chamber 352 is a bellows-type air bag formed of a suitable elastomeric material, such as rubber. With reference to FIGS. 9-10, lift air chamber 352 (FIGS. 3-8) is pneumatically connected to a pressurized air source 290 (FIGS. 9-10) located on the heavy-duty vehicle, such as an air tank, via a pneumatic supply line 398, and is capable of expanding upon introduction of pressurized air from the air source into the lift air chamber, as well as collapsing upon exhaust of pressurized air from the lift air chamber, the operation of which will be described in detail below. With reference to FIG. 5, lift air chamber 352 includes a front mounting bolt 366, which extends frontwardly from the lift air chamber and is disposed through an opening (not shown) formed in rear plate 354 of mounting bracket 351 of under beam lift assembly 350. A nut 367 threadably engages front mounting bolt 366 to removably secure the front end of lift air chamber 352 to rear plate 354 of mounting bracket 351 of under beam lift assembly 350. With reference to FIGS. 3-4 and 6-8, the rear end of lift air chamber 352 is removably secured to the front of mounting plate 372 of lift bracket 371 of under beam lift assembly 350 via a pair of fasteners 373 disposed through openings (not shown) formed in the mounting plate that engage the front of the lift air chamber. It is to be understood that lift air chamber 352 of under beam lift assembly 350 can include a different configuration, structure, and/or components than that shown and described without affecting the overall concept or operation of the disclosed subject matter.

Having now described the structure of exemplary embodiment under beam lift assembly 350 of the disclosed subject matter, its operation will now be described. An under beam lift assembly 350 is preferably removably mounted to each of the driver-side and passenger-side hangers 212 of lift axle/suspension system 210 in the manner described above.

Both the driver-side under beam lift assembly 350 and the passenger-side under beam lift assembly operate simultaneously to lift axle 235 of lift axle/suspension system 210, and thus lift the associated wheels from contact with the ground. For purposes of conciseness and clarity, only the operation of the driver-side under beam lift assembly 350 will be described in detail below.

With particular reference to FIG. 7, when the operator of the heavy-duty vehicle desires to raise or lift axle 235 of lift axle/suspension system 210, to which exemplary embodiment under beam lift assembly 350 is removably mounted, the air spring (not shown) mounted on top plate 230 of beam 224 of suspension assembly 211 is deflated and lift air chamber 352 is concurrently inflated, which applies force to and causes lift bracket 371 connected thereto to pivot arcuately upwardly about its pivotal connection to mounting bracket 351 in the direction shown by arrow A. As lift bracket 371 pivots arcuately upwardly, pad 379 attached to beam contact plate 378 contacts bottom wall 226 of beam 224 and lifts the beam, thereby lifting axle 235 and the associated wheels from contact with the ground, when desired.

Conversely, with reference to FIG. 8, when the operator of the heavy-duty vehicle desires to lower axle 235 of lift axle/suspension system 210, and thus lower the wheels associated with the axle back into contact with the ground, the air spring mounted on top plate 230 of beam 224 of suspension assembly 211 is inflated and lift air chamber 352 of the under beam lift assembly is concurrently deflated, which removes the force applied to lift bracket 371 by the lift air chamber, thereby allowing the lift bracket of the under beam lift assembly to pivot arcuately downwardly relative to its pivotal connection to mounting bracket 351 of the under beam lift assembly in the direction shown by arrow A', and further allowing the axle to lower until the associated wheels are back in contact with the ground.

In accordance with an important aspect of the disclosed subject matter, exemplary embodiment under beam lift assembly 350 is configured such that it is removably attachable to the heavy-duty vehicle without welds. More specifically, under beam lift assembly 350 is configured such that it requires only mounting bracket 351 of the under beam lift assembly to be connected to hanger 212 to install the under beam lift assembly on lift axle/suspension system 210. As described above, removable attachment of mounting bracket 351 of under beam lift assembly 350 to hanger 212 of the lift axle/suspension system 210 is facilitated via front mounting bolts 364 (FIG. 5), which are disposed through respective aligned openings 356 (FIG. 6—only one shown) of mounting arms 355 (FIGS. 4-6) of rear plate 354 (FIGS. 3-8) and the respective openings formed in front cross member support 220 (FIGS. 3-5 and 7-8) of the hanger and threadably engage nuts (not shown) to secure the rear plate to the hanger. With reference to FIGS. 3-5 and 7-8, removable attachment of mounting bracket 351 to hanger 212 is further facilitated via rear mounting bolts 362A disposed through respective aligned openings formed in flange 216 of hanger 212 and openings 360 (FIG. 6) of attachment lip 359 of the outboard side plate 358, which threadably engage nuts (not shown) to secure the outboard side plate to the hanger, as well as rear mounting bolts 362B disposed through respective aligned openings formed in rear cross member support 218 of hanger 212 and openings 360 formed in attachment lip 359 of the inboard side plate 358, which threadably engage nuts (not shown) to secure the inboard side plate to the hanger.

In this manner, mounting bracket 351, and thus under beam lift assembly 350, is removably attached to lift axle/suspension system 210, and thus the heavy-duty vehicle, via only mechanical fasteners, including front mounting bolts 364, rear mounting bolts 362A, rear mounting bolts 362B, and their associated nuts, which eliminates the need to utilize welds to attach under beam lift assembly 350 to lift axle/suspension system 210 of the heavy-duty vehicle, thereby providing a less labor intensive installation process.

In accordance with another important aspect of the disclosed subject matter, exemplary embodiment under beam lift assembly 350 of the disclosed subject matter includes structure that enables it to be attached to lift axle/suspension system 210, and thus the heavy-duty vehicle, such that the under beam lift assembly pivots in an axis different than an axis of the pivotal connection between beam 224 of suspension assembly 211 and hanger 212 of the lift axle/suspension system. More specifically, and with reference to FIGS. 3-8, as described above, lift bracket 371 of under beam lift assembly 350 is pivotally connected to mounting bracket 351 of the under beam lift assembly via pivot bolts 368 disposed through respective transversely aligned openings of pivot bushings 382 (FIG. 6) and the openings (not shown) of side plates 358 of the mounting bracket positioned frontward of access cutouts 353, which threadably engage respective nuts 369 to pivotally connect side arms 376 of the lift bracket to the side plates of the mounting bracket. Thus, the pivotal connection of lift bracket 371 to mounting bracket 351 is generally frontward of and in a separate pivotal axis removed from the pivotal axis of the pivotal connection of beam 224 of suspension assembly 211 of lift axle/suspension system 210 to hanger 212 of the lift axle/suspension system via bushing assembly 214.

Because the pivotal connection of lift bracket 371 of under beam lift assembly 350 to mounting bracket 351 of the under beam lift assembly exists in a separate pivotal axis and is removed from the pivotal axis of the pivotal connection of beam 224 to hanger 212, when axle 235 of lift axle/suspension system 210 and the associated wheels are raised or lifted via actuation of the under beam lift assembly, the downward force directed on the lift bracket from lift axle/suspension system 210 via contact of pad 379 attached to beam contact plate 378 with bottom wall 226 of beam 224, is reacted about the separate pivotal axis, and thus ultimately by hanger 212 to which the mounting bracket is removably attached, and not by components of the pivotal connection of the beam to the hanger, such as bushing 221 and the pivot bolt of bushing assembly 214. This configuration of under beam lift assembly 350 significantly minimizes or eliminates stress on the pivotal connection between beam 224 and hanger 212 of lift axle/suspension system 210 when the under beam lift assembly is actuated and axle 235 and the associated wheels are lifted, thereby protecting the integrity of components of the pivotal connection of the beam to the hanger, such as bushing 221 and/or the pivot bolt of bushing assembly 214.

In accordance with yet another important aspect of the disclosed subject matter, exemplary embodiment under beam lift assembly 350 of the disclosed subject matter is configured such that there is no rigid attachment of the under beam lift assembly to beam 224 of suspension assembly 211 of lift axle/suspension system 210. More specifically, and with particular reference to FIG. 7, during actuation of under beam lift assembly 350 to raise or lift axle 235 of lift axle/suspension system 210, and thus lift the associated wheels, as lift air chamber 352 of the under beam lift assembly is inflated and the air spring (not shown) mounted on top plate 230 of beam 224 of suspension assembly 211 is deflated, the lift air chamber applies force to lift bracket 371 so that the lift bracket pivots arcuately upwardly about its pivotal connection to mounting bracket 351 of the under beam lift assembly in the direction shown by arrow A, and pad 379 attached to beam contact plate 378 contacts bottom wall 226 of beam 224 and lifts the beam, thereby lifting axle 235 and the associated wheels from contact with the ground, when desired.

With reference to FIG. 8, when the operator of the heavy-duty no longer desires to maintain axle 235 of lift axle/suspension system 210 and the associated wheels in a lifted state, and thus lower the wheels back into contact with the ground, the air spring (not shown) mounted on top plate 230 of beam 224 of suspension assembly 211 is inflated and lift air chamber 352 of under beam lift assembly 350 is deflated via exhaust of pressurized air from the lift air chamber, as will be described in greater detail below, and the force applied to lift bracket 371 by the lift air chamber is removed, which causes lift bracket 371 of the under beam lift assembly to pivot arcuately downwardly relative to its pivotal connection to mounting bracket 351 of the under beam lift assembly in the direction shown by arrow A', thereby allowing the axle to lower until the wheels are back in contact with the ground. Because lift bracket 371 is not attached to beam 224 of suspension assembly 211 of lift axle/suspension system 210, once lift air chamber 352 is sufficiently deflated and the lift bracket is no longer in contact with beam 224, the beam can articulate downwardly relative to its pivotal connection to hanger 212 during rebound of the lift axle/suspension system without articulating and/or contacting components of under beam lift assembly 350, thereby reducing stress on and increasing durability of components of the under beam lift assembly, such as the lift air bracket and the lift air chamber, and/or minimizing the potential for damage to the beam of the suspension assembly during operation of the heavy-duty vehicle when the under beam lift assembly is unactuated.

Moreover, exemplary embodiment under beam lift assembly 350 includes a self-retaining vacuum retention system 389 that ensures that the under beam lift assembly is maintained in a fully retracted state when not actuated to minimize the potential of damage to components of the under beam lift assembly and/or beam 224 of suspension assembly 211 during rebound of lift axle/suspension system 210. More specifically, and with reference to FIGS. 9-10, vacuum retention system 389 includes a 2-way air piloted check valve 390 that is in fluid communication with air source 290 located on the heavy-duty vehicle via pneumatic supply line 398. Pneumatic supply line 398 includes a pneumatic supply check valve 394 positioned along the supply line that ensures that pressurized air from air source 290 can flow to air piloted check valve 390, but cannot flow back from the air piloted check valve towards the air source. Air piloted check valve 390 in turn is in fluid communication with lift air chamber 352 of under beam lift assembly 350 via a lift air chamber pneumatic line 399. Air piloted check valve 390 further includes a pilot opening 391, which is in fluid communication with air source 290 via a pneumatic pilot line 396. Air piloted check valve 390 further includes an exhaust port 393 that is in fluid communication with an exhaust check valve 392.

With particular reference to FIG. 9, when the operator of the heavy-duty vehicle actuates under beam lift assembly 350 to raise or lift axle 235 of lift axle/suspension system 210, and thus lift the associated wheels from contact with the ground, pressurized air from air source 290 is directed from the air source to pilot opening 391 of air piloted check valve 390 via pneumatic pilot line 396 to place the air piloted check valve in a piloted state. Such piloting of air piloted check valve 390 can be initiated by an operator of the heavy-duty vehicle by any suitable means, such as a switch operatively connected to components of vacuum retention system 389 located in the vehicle cab. While in the piloted state, air piloted check valve 390 enables pressurized air to flow from air source 290, through pneumatic supply line 398, the air piloted check valve, lift air chamber pneumatic line 399, and to lift air chamber 352 to inflate the lift air chamber, which causes lift bracket 371 of under beam lift assembly 350 connected thereto to pivot arcuately upwardly about the pivotal connection to mounting bracket 351 of the under beam lift assembly, such that pad 379 attached to beam contact plate 378 of the lift bracket contacts bottom wall 226 of beam 224 and lifts the beam, thereby lifting axle 235 and the associated wheels from contact with the ground, as shown in FIG. 7.

With particular reference to FIG. 10, when the operator of the heavy-duty vehicle desires to lower axle 235 of lift axle/suspension system 210 on which under beam lift assembly 350 is removably mounted, and thus lower the wheels associated with the axle back into contact with the ground, the flow of pressurized air from air source 290 to pilot opening 391 of air piloted check valve 390 via pneumatic pilot line 396 is terminated to place the air piloted check valve in an unpiloted state. Such unpiloting of air piloted check valve 390 can be initiated by an operator of the heavy-duty vehicle by any suitable means, such as a switch operatively connected to components of vacuum retention system 389 located in the vehicle cab. While in the unpiloted state, the flow of pressurized air from air piloted check valve 390 to lift air chamber 352 of under beam lift assembly 350 via lift air chamber pneumatic line 399 is terminated and the lift air chamber is in fluid communication with exhaust port 393 of the air piloted check valve via the lift air chamber pneumatic line, which in turn is in fluid communication with exhaust check valve 392. Because lift air chamber 352 is in fluid communication with exhaust port 393 of air piloted check valve 390 via lift air chamber pneumatic line 399, as lift bracket 371 of under beam lift assembly 350 pivots arcuately downwardly relative to its pivotal connection to mounting bracket 351 of the under beam lift assembly via downward articulation of beam 224 of suspension assembly 211 of lift axle/suspension system 210, pressurized air from within the lift air chamber of the under beam lift assembly flows from the lift air chamber, through the lift air chamber pneumatic line, the exhaust port of the air piloted check valve, exhaust check valve 392, and ultimately to atmosphere. Pressurized air is exhausted from lift air chamber 352 of under beam lift assembly 350 in this manner until the lift air chamber is fully collapsed, as shown in FIG. 8, and there is sufficient clearance for beam 224 of lift axle/suspension system 210 to articulate arcuately downwardly without contacting lift bracket 371 during rebound of the lift axle/suspension system.

Furthermore, because vacuum retention system 389 employs exhaust check valve 392, once the pressurized air is exhausted from lift air chamber 352 of under beam lift assembly 350 and the lift air chamber is collapsed, air from atmosphere is prevented from entering back into the lift air chamber through the exhaust check valve, and thus the lift air chamber is maintained under vacuum. In this manner, self-retaining vacuum retention system 389 of under beam lift assembly 350 maintains the under beam lift assembly in a fully retracted state when not actuated to minimize the potential for damage to components of the under beam lift assembly and/or beam 224 of suspension assembly 211 during rebound of lift axle/suspension system 210.

In accordance with another important aspect of the disclosed subject matter, exemplary embodiment under beam lift assembly 350 includes structure that enables it to be mounted to the heavy-duty vehicle at different points in the manufacturing process of lift axle/suspension system 210 and/or the heavy-duty vehicle. More specifically, as each under beam lift assembly 350 is removably attached to a respective hanger 212 of lift axle/suspension system 210 by removable attachment of mounting bracket 351 of the under beam lift assembly to the hanger via front mounting bolts 364 (FIG. 5), rear mounting bolts 362A (FIGS. 3-5 and 7-8), and rear mounting bolts 362B (FIGS. 4-5), and does not require attachment of lift bracket 371 of the under beam assembly to beam 224, the under beam lift assemblies can be installed on lift axle/suspension system 210 before pivotal attachment of the beams to hangers 212. With reference to FIGS. 3 and 7-8, access cutouts 353 of side plates 358 of mounting bracket 351 of under beam lift assembly 350 are transversely aligned with and provide access to bushing assembly 214 such that the pivot bolt (not shown) and washers (not shown) of the bushing assembly can pass through the access cutouts to enable pivotal connection of beam 224 to hanger 212 in a manner known in the art. In addition, the access to bushing assembly 214 provided by access cutouts 353 enable adjustment and/or alignment of the pivot bolt of the bushing assembly, and/or servicing or replacement of components of the bushing assembly, without requiring removal of under beam lift assembly 350 from lift axle/suspension system 210. Furthermore, because each under beam lift assembly 350 is removably attached to only hanger 212 of lift axle/suspension system 210 and provides access to bushing assembly 214 via cutouts 353, beam 224 of suspension assembly 211 can be disconnected from hanger 212, and thus be removed from the heavy-duty vehicle for servicing, such as to replace bushing 221 of the bushing assembly, without requiring the under beam lift assembly to be removed from the lift axle/suspension system.

Moreover, as under beam lift assembly 350 is removably attached to hanger 212 of lift axle/suspension system 210 by removable attachment of mounting bracket 351 to the hanger via front mounting bolts 364 (FIG. 5), rear mounting bolts 362A (FIGS. 3-5 and 7-8), and rear mounting bolts 362B (FIGS. 4-5), the under beam lift assembly can also be installed on the lift axle/suspension system after manufacturing of the lift axle/suspension system is completed, either before or after the lift axle/suspension system is attached to the main members of the frame of the heavy-duty vehicle. In addition, because each under beam lift assembly 350 is removably attached to only hanger 212 of lift axle/suspension system 210 via front mounting bolts 364 (FIG. 5), rear mounting bolts 362A (FIGS. 3-5 and 7-8), and rear mounting bolts 362B (FIGS. 4-5), and does not require attachment of lift bracket 371 of the under beam assembly to beam 224, the under beam lift assembly, or components thereof, can be independently serviced or replaced.

Furthermore, because the pivotal connection of lift bracket 371 of under beam lift assembly 350 to mounting bracket 351 of the under beam lift assembly exists in a separate pivotal axis and is removed from the pivotal axis of the pivotal connection of beam 224 to hanger 212 and the under beam lift assembly is removably connected to lift axle/suspension system 210 via front mounting bolts 364 (FIG. 5), rear mounting bolts 362A (FIGS. 3-5 and 7-8), and rear mounting bolts 362B (FIGS. 4-5), the under beam lift assembly can be fully assembled into one packaged unit prior to installation on the lift axle/suspension system, thereby reducing installation complexity.

In this manner, exemplary embodiment under beam lift assembly 350 is configured such that it can be mounted to lift axle/suspension system 210, and thus the heavy-duty vehicle, at different points during the manufacturing process of the lift axle/suspension system and/or heavy-duty vehicle, such as before/after beam 224 of suspension assembly 211 of the lift axle/suspension system is attached to hanger 212 or before/after the lift axle/suspension system is attached to the main members of the frame of the heavy-duty vehicle, thereby providing greater installation flexibility and/or enabling independent servicing or replacement of components of the under beam lift assembly and/or lift axle/suspension system.

Thus, exemplary embodiment under beam lift assembly for heavy-duty vehicles 350 of the disclosed subject matter is removably mounted to the axle/suspension system of the heavy-duty vehicle utilizing mechanical fasteners, which eliminates the need for welds to attach the under beam lift assembly to the axle/suspension system, thereby eliminating the need for specialized technical skill/knowledge and specialized equipment to perform the installation process and providing a less labor intensive and less costly installation process. Exemplary embodiment under beam lift assembly 350 includes structure that enables it to be attached to the axle/suspension system of the heavy-duty vehicle such that the under beam lift assembly pivots in an axis different than an axis of the pivotal connection between a beam of a suspension assembly of the axle/suspension system and a hanger of the axle/suspension system. This significantly minimizes or eliminates stress on the pivotal connection between the beam and the hanger when the under beam lift assembly is actuated, thereby protecting the integrity of components of the pivotal connection of the beam to the hanger, such as a bushing and/or pivot bolt of a bushing assembly, during actuation of the under beam lift assembly. Moreover, exemplary embodiment under beam lift assembly 350 is configured such that there is no rigid attachment of the under beam lift assembly to the beam of the suspension assembly of the axle/suspension system, which prevents components of the under beam lift assembly from articulating with the beam during operation of the heavy-duty vehicle when the under beam lift assembly is unactuated, thereby reducing stress on components of the under beam lift assembly and/or axle/suspension system during such operation of the heavy-duty vehicle. Furthermore, exemplary embodiment under beam lift assembly 350 includes a self-retaining vacuum retention system for a lift air chamber of the under beam lift assembly that maintains the under beam lift assembly in a fully retracted state when not actuated, which minimizes the potential for damage to components of the under beam lift assembly and/or beam of the suspension assembly of the axle/suspension system during axle/suspension system rebound. In addition, exemplary embodiment under beam lift assembly 350 is configured such that it can be mounted to the axle/suspension system of the heavy-duty vehicle at different points during the manufacturing process of the axle/suspension system and/or the heavy-duty vehicle, such as before/after the beam of the suspension assembly of the axle/suspension system is attached to the hanger or before/after the axle/suspension system is attached to a frame of the heavy-duty, thereby providing greater installation flexibility and/or enabling independent servicing or replacement of components of the under beam lift assembly and/or axle/suspension system. Moreover, exemplary under beam lift assembly 350 includes structure that enables adjustment and/or alignment of the pivot bolt of the bushing assembly used to pivotally connect the suspension assembly to the hanger of the axle/suspension system, and/or enables servicing or replacement of components of the bushing assembly, without requiring removal of the under beam lift assembly from the axle/suspension system. Furthermore, because exemplary embodiment under beam lift assembly 350 pivots in an axis different than the axis of the pivotal connection between the beam of the suspension assembly of the axle/suspension system and the hanger of the axle/suspension system and utilizes mechanical fasteners to removably mount the under beam lift assembly to the axle/suspension system, the under beam lift assembly can be fully assembled into one packaged unit prior to installation on the axle/suspension system, thereby reducing installation complexity.

It is contemplated that exemplary embodiment under beam lift assembly 350 of the disclosed subject matter could be utilized on trucks, tractor-trailers or other heavy-duty vehicles having one or more than one axle without changing the overall concept or operation of the disclosed subject matter. It is further contemplated that exemplary embodiment under beam lift assembly 350 could be utilized in connection with vehicles having frames or subframes which are moveable or non-movable without changing the overall concept of the present invention. It is yet even further contemplated that exemplary embodiment under beam lift assembly 350 could be utilized on other types of air-ride leading and/or trailing arm rigid beam-type axle/suspension system designs known to those skilled in the art without changing the overall concept or operation of the disclosed subject matter. For example, exemplary embodiment under beam lift assembly 350 finds application in connection with lift axle/suspension systems having beams or arms that are made of materials other than steel, such as aluminum, other metals, metal alloys, composites, and/or combinations thereof. It is also contemplated that exemplary embodiment under beam lift assembly 350 could be utilized in connection with lift axle/suspension systems having either an overslung/top-mount configuration or an underslung/bottom-mount configuration, without changing the overall concept of the present invention. It is yet even further contemplated that exemplary embodiment under beam lift assembly 350 could be employed as an option for non-lift axle/suspension systems to convert them to lift axle/suspension systems without affecting the overall concept or operation of the disclosed subject matter.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the disclosed subject matter has been described with reference to a specific embodiment. It shall be understood that this illustration is by way of example and not by way of limitation, as the scope of the invention is not limited to the exact details shown or described. Potential modifications and alterations will occur to others upon a reading and understanding of the disclosed subject matter, and it is understood that the disclosed subject matter includes all such modifications, alterations, and equivalents thereof.

Having now described the features, discoveries and principles of the disclosed subject matter, the manner in which the under beam lift assembly for heavy-duty vehicles is constructed, arranged, and used, the characteristics of the construction and arrangement, and the advantageous, new, and useful results obtained; the new and useful structures, devices, elements, arrangements, parts, and combinations are set forth in the claims.

What is claimed is:

1. An under beam lift assembly for an axle/suspension system of a heavy-duty vehicle, said under beam lift assembly comprising:
   a first portion removably connected to said heavy-duty vehicle, said first portion including a pair of side plates;
   a second portion, said second portion including a pair of side arms, each one of said pair of side arms being pivotally connected to a respective one of said pair of side plates of said first portion, the second portion pivoting in an axis different than an axis of a pivotal connection between a suspension assembly and a hanger of said axle/suspension system;
   a lift element operatively connected to said second portion, wherein actuation of said lift element causes arcuate upward movement of said suspension assembly via contact with the second portion; and
   wherein the under beam lift assembly is free of contact with said pivotal connection between suspension assembly and said hanger.

2. The under beam lift assembly for an axle/suspension system of a heavy-duty vehicle of claim 1, wherein said second portion is free of attachment to said suspension assembly.

3. The under beam lift assembly for an axle/suspension system of a heavy-duty vehicle of claim 1, wherein said first portion is removably connected to said heavy-duty vehicle via fasteners.

4. The under beam lift assembly for an axle/suspension system of a heavy-duty vehicle of claim 1, wherein said first portion is removably connected to said hanger of said axle/suspension system.

5. The under beam lift assembly for an axle/suspension system of a heavy-duty vehicle of claim 4, wherein said hanger reacts a load of said suspension assembly during arcuate upward movement of the suspension assembly via contact with said second portion.

6. The under beam lit assembly for an axle/suspension system of a heavy-duty vehicle of claim 1, wherein said second portion contacts a beam of said suspension assembly during arcuate upward movement of said suspension assembly via contact with the second portion.

7. The under beam lift assembly for an axle/suspension system of a heavy-duty vehicle of claim 1, wherein said lift element is bellows-type air bag formed of an elastomeric material.

8. The under beam lift assembly for an axle/suspension system of a heavy-duty vehicle of claim 1, wherein said first portion is a mounting bracket, said second portion is a lift bracket, and said lift element is a lift chamber operatively connected to said mounting bracket and said lift bracket.

9. The under beam lift assembly for an axle/suspension system of a heavy-duty vehicle of claim 8, said mounting bracket including:
   a rear plate, a first end of said lift chamber being operatively connected to said rear plate and a second end of the lift chamber being operatively connected to said lift bracket;
   a bottom wall, said bottom wall being rigidly connected to the rear plate;
   said pair of side plates, the pair of side plates being rigidly connected to said rear plate and the bottom wall; and
   wherein at least one of the rear plate and said pair of side plates are removably connected to said heavy-duty vehicle.

10. The under beam lift assembly for an axle/suspension system of a heavy-duty vehicle of claim 9, wherein at least one of said rear plate and said pair of side plates are removably connected to said hanger of said axle/suspension system.

11. The under beam lift assembly for an axle/suspension system of a heavy-duty vehicle of claim 10, wherein each one of said pair of side plates includes a lip with at least one opening, said at least one opening of each of said lips aligning with a respective opening formed in said hanger, a fastener being disposed through each of said at least one openings of the lips and said respective openings formed in the hanger to removably connect said mounting bracket to said hanger.

12. The under beam lift assembly for an axle/suspension system of a heavy-duty vehicle of claim 11, wherein said openings of said hanger are formed in a flange or a cross member support of the hanger.

13. The under beam lift assembly for an axle/suspension system of a heavy-duty vehicle of claim 10, wherein said rear plate includes at least one opening, said at least one opening aligning with a respective opening formed in said hanger, a fastener being disposed through said at least one opening of the rear plate and said respective opening formed in the hanger to removably connect said mounting bracket to said hanger.

14. The under beam lift assembly for an axle/suspension system of a heavy-duty vehicle of claim 9, wherein at least one of said pair of side plates includes an access cutout, said access cutout providing access to said pivotal connection between said suspension assembly and said hanger of said axle/suspension system.

15. The under beam lift assembly for an axle/suspension system of a heavy-duty vehicle of claim 8, said lift bracket including:
   a lift chamber mounting plate, a first end of said lift chamber being operatively connected to said mounting bracket and a second end of the lift chamber being operatively connected to said lift chamber mounting plate;
   a rear wall, said rear wall being rigidly connected to the lift chamber mounting plate;
   said pair of side arms, the pair of side arms being transversely spaced from one another and rigidly connected to the rear wall and said lift chamber mounting plate;
   a support member, said support member being rigidly connected to the lift chamber mounting plate and said rear wall; and
   a contact plate, said contact plate being rigidly connected to the rear wall and the support member, the contact plate contacting said suspension assembly during arcuate upward movement of said suspension assembly.

16. The under beam lift assembly for an axle/suspension system of a heavy-duty vehicle of claim 15, wherein said lift bracket further includes a pad attached to a top surface of said contact plate, said pad contacting said suspension assembly during arcuate upward movement of the suspension assembly.

17. The under beam lift assembly for an axle/suspension system of a heavy-duty vehicle of claim 16, wherein said pad is formed of an elastomeric material.

18. The under beam lift assembly for an axle/suspension system of a heavy-duty vehicle of claim 15, wherein each of said pair of side arms includes a boss with a pivot bushing disposed therewithin, said pivot bushings pivotally connecting the pair of side arms to said pair of side plates of said mounting bracket.

19. The under beam lift assembly for an axle/suspension system of a heavy-duty vehicle of claim 1, said under beam lift assembly further including a self-retaining vacuum retention system, said self-retaining vacuum retention system maintaining said under beam lift assembly in a fully retracted state when said lift element is unactuated and said second portion is not in contact with said suspension assembly.

20. The under beam lift assembly for an axle/suspension system of a heavy-duty vehicle of claim 19, said self-retaining vacuum retention system including:
 a two-way air piloted check valve, said two-way air piloted check valve being in fluid communication with said lift element and an air source located on said heavy-duty vehicle, the two-way piloted check valve including an exhaust port, whereby said two-way air piloted check valve exhausts air from the lift element through said exhaust port and to atmosphere when the two-way air piloted check valve is in an unpiloted state to maintain said under beam lift assembly in said fully retracted state, said two-way air piloted check valve enabling actuation of said lift element and arcuate upward movement of said suspension assembly via contact with said second portion when in a piloted state.

21. The under beam lift assembly for an axle/suspension system of a heavy-duty vehicle of claim 20, said self-retaining vacuum retention system further including a check valve fluidly connected to said exhaust port, said check valve preventing air from flowing from atmosphere, through said two-way air piloted check valve, and to said lift element when the two-way air piloted check valve is in said unpiloted state to maintain said under beam lift assembly in said fully retracted state.

22. The under beam lift assembly for an axle/suspension system of a heavy-duty vehicle of claim 20, said self-retaining vacuum retention system further including a check valve fluidly connected between said air source and said two-way air piloted check valve, said check valve preventing air from flowing from said lift element, through the two-way air piloted check valve, and to the air source when said two-way air piloted check valve is in said piloted state.

23. An under beam lift assembly for an axle/suspension system of a heavy-duty vehicle, said under beam lift assembly comprising:
 a first portion removably connected to a front portion and a rear portion of a hanger of said axle/suspension system;
 a second portion pivotally connected to said first portion, said second portion pivoting in an axis different than an axis of a pivotal connection between a suspension assembly and said hanger;
 a lift element operatively connected to the second portion, wherein actuation of said lift element causes arcuate upward movement of said suspension assembly via contact with said second portion; and
 wherein the under beam lift assembly is free of contact with said pivotal connection between the suspension assembly and the hanger.

24. An under beam lift assembly for an axle/suspension system of a heavy-duty vehicle, said under beam lift assembly comprising:
 a first portion removably connected to said heavy-duty vehicle, said first portion being a mounting bracket, said mounting bracket including:
  a rear plate, said rear plate including at least one opening, said at least one opening aligning with a respective opening formed in a hanger of said axle/suspension system, a fastener being disposed through the at least one opening of the rear plate and said respective opening formed in said hanger to removably connect the mounting bracket to the hanger;
  a bottom wall, said bottom wall being rigidly connected to the rear plate; and
  a pair of side plates, said side pair of side plates being rigidly connected to said rear plate and the bottom wall, wherein at least one of the rear plate and the pair of side plates are removably connected to said heavy-duty vehicle;
 a second portion pivotally connected to said first portion, said second portion being a lift bracket, the second portion pivoting in an axis different than an axis of a pivotal connection between a suspension assembly and said hanger of said axle/suspension system;
 a lift element, said lift element being a lift chamber with a first end operatively connected to said rear plate of said mounting bracket and a second end operatively connected to said lift bracket, wherein actuation of the lift element causes arcuate upward movement of said suspension assembly via contact with said second portion;
 wherein the under beam lift assembly is free of contact with said pivotal connection between the suspension assembly and the hanger; and
 wherein at least one of said rear plate and said pair of side plates are removably connected to said hanger of the axle/suspension system.

25. An under beam lift assembly for an axle/suspension system of a heavy-duty vehicle, said under beam lift assembly comprising:
 a first portion removably connected to said heavy-duty vehicle, said first portion being a mounting bracket, said mounting bracket including:
  a rear plate;
  a bottom wall, said bottom wall being rigidly connected to said rear plate; and
  a pair of side plates, said pair of side plates being rigidly connected to the rear plate and the bottom wall;
 a second portion pivotally connected to said first portion, said second portion being a lift bracket, the second portion pivoting in an axis different than an axis of a pivotal connection between a suspension assembly and said hanger of the axle/suspension system;
 a lift element, said lift element being a lift chamber with a first end operatively connected to said rear plate of said mounting bracket and a second end operatively connected to said lift bracket, wherein actuation of the lift element causes arcuate upward movement of said suspension assembly via contact with the second portion;
 wherein the under beam lift assembly is free of contact with said pivotal connection between the suspension assembly and the hanger; and
 wherein at least one of the pair of side plates includes an access cutout, said access cutout providing access to the pivotal connection between said suspension assembly and said hanger of said axle/suspension system.

26. An under beam lift assembly for an axle/suspension system of a heavy-duty vehicle, said under beam lift assembly comprising:
- a first portion removably connected to said heavy-duty vehicle, said first portion being a mounting bracket;
- a second portion pivotally connected to said first portion, said second portion being a lift bracket, said lift bracket including:
  - a lift chamber mounting plate;
  - a rear wall, said rear wall being rigidly connected to said lift chamber mounting plate;
  - a pair of side arms, said pair of side arms being transversely spaced from one another and rigidly connected to the rear wall and the lift chamber mounting plate, the pair of side arms being pivotally connected to the mounting bracket;
  - a support member, said support member being rigidly connected to said lift chamber mounting plate and said rear wall; and
  - a contact plate, said contact plate being rigidly connected to the rear wall and the support member;
- the second portion pivoting in an axis different than an axis of a pivotal connection between a suspension assembly and a hanger of said axle/suspension system;
- a lift element, said lift element being a lift chamber with a first end operatively connected to said mounting bracket and a second end operatively connected to said lift chamber mounting plate, wherein actuation of the lift element causes arcuate upward movement of said suspension assembly via contact with the contact plate of the lift bracket; and
- wherein the under beam lift assembly is free of contact with said pivotal connection between the suspension assembly and said hanger.

27. An under beam lift assembly for an axle/suspension system of a heavy-duty vehicle, said under beam lift assembly comprising:
- a first portion removably connected to said heavy-duty vehicle;
- a second portion pivotally connected to said first portion, said second portion pivoting in an axis different than an axis of a pivotal connection between a suspension assembly and a hanger of said axle/suspension system;
- a lift element operatively connected to the second portion, wherein actuation of said lift element causes arcuate upward movement of said suspension assembly via contact with said second portion;
- wherein the under beam lift assembly is free of contact with said pivotal connection between the suspension assembly and said hanger; and
- wherein said under beam lift assembly further includes a self-retaining vacuum retention system, said self-retaining vacuum retention system maintaining the under beam lift assembly in a fully retracted state when the lift element is unactuated and the second portion is not in contact with said suspension assembly.

\* \* \* \* \*